(12) United States Patent
Crisp et al.

(10) Patent No.: US 11,681,769 B2
(45) Date of Patent: *Jun. 20, 2023

(54) METHOD OF PUBLISHING AND DELIVERING AN ELECTRONIC NEWSPAPER

(71) Applicant: Block Communications, Inc., Toledo, OH (US)

(72) Inventors: John David Crisp, Sylvania, OH (US); Joseph Michael Holub, Toledo, OH (US); Stephen Raymond Bumbaugh, Toledo, OH (US); Charles Aaron Ryder, Monroe, MI (US); Joshua Sherman Jacob, Perrysburg, OH (US)

(73) Assignee: BLOCK COMMUNICATIONS, INC., Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,515

(22) Filed: May 16, 2022

(65) Prior Publication Data

US 2022/0277051 A1  Sep. 1, 2022

Related U.S. Application Data

(63) Continuation of application No. 16/948,916, filed on Oct. 6, 2020, now Pat. No. 11,366,867, which is a
(Continued)

(51) Int. Cl.
*G06F 16/00* (2019.01)
*G06F 16/954* (2019.01)
(Continued)

(52) U.S. Cl.
CPC .......... *G06F 16/954* (2019.01); *G06F 16/904* (2019.01); *G06F 16/9038* (2019.01); *G06F 16/951* (2019.01)

(58) Field of Classification Search
CPC .... G06F 16/954; G06F 16/958; G06F 16/951; G06F 16/904; G06F 16/93; G06F 16/9038
See application file for complete search history.

(56) References Cited

U.S. PATENT DOCUMENTS 6,990,633 B1 * 1/2006 Miyasaka ........... G06F 16/9535
715/201
9,141,591 B2 * 9/2015 Pereymer .............. G06F 40/143
(Continued)

*Primary Examiner* — Leslie Wong
(74) *Attorney, Agent, or Firm* — William J. Clemens; Shumaker, Loop & Kendrick, LLP

(57) ABSTRACT

A system for preparing and delivering digital information, particularly digital newspaper editions, to mobile application users. The system includes mobile applications (apps) for both mobile phone and tablet devices, with content display and interactivity of each app optimized for device type. The system also includes a suite of back-office software modules which allow writers and editors to prepare stories, images and other content for delivery to the apps. One such module is a story creator, which includes an interface to a content management system allowing plain text stories and images to be imported, formatted and made interactive for delivery to the apps. The story creator module also includes interfaces to providers of data such as obituaries, classified ads and weather, and functionality for publishing daily editions of the digital newspaper using the imported content. Other features of the system include breaking news alerts, paywall integration, and interfaces to social media.

5 Claims, 41 Drawing Sheets

Related U.S. Application Data continuation of application No. 16/146,382, filed on Sep. 28, 2018, now Pat. No. 10,872,126.

(51) Int. Cl.
  *G06F 16/904* (2019.01)
  *G06F 16/951* (2019.01)
  *G06F 16/9038* (2019.01)

(56) References Cited

U.S. PATENT DOCUMENTS

| | | | | |
|---|---|---|---|---|
| 2001/0037348 | A1* | 11/2001 | Nakada | G06F 16/9535 715/255 |
| 2002/0152245 | A1* | 10/2002 | McCaskey | G06F 16/958 715/255 |
| 2008/0248788 | A1* | 10/2008 | Smith | G06Q 30/0267 455/414.3 |
| 2011/0041050 | A1* | 2/2011 | Taylor | G06Q 30/0251 715/229 |
| 2011/0131482 | A1* | 6/2011 | Shteinvil | G06F 40/58 715/229 |
| 2012/0233631 | A1* | 9/2012 | Geshwind | H04N 21/44016 725/35 |
| 2013/0080264 | A1* | 3/2013 | Umeda | G06Q 30/02 705/14.69 |
| 2013/0275858 | A1* | 10/2013 | Miyamoto | G06F 40/166 715/234 |
| 2013/0305145 | A1* | 11/2013 | Jackson | G06F 40/103 715/246 |
| 2014/0040070 | A1* | 2/2014 | Pereymer | G06F 16/9577 705/26.8 |
| 2014/0115435 | A1* | 4/2014 | Elseth | G06F 40/197 715/229 |
| 2014/0143835 | A1* | 5/2014 | Brennan | G06F 40/114 715/239 |
| 2015/0024353 | A1* | 1/2015 | Chesnutt | G09B 19/00 434/219 |
| 2015/0358689 | A1* | 12/2015 | Wen | H04N 21/4331 725/32 |
| 2016/0140093 | A1* | 5/2016 | Block | G06F 40/134 715/205 |
| 2018/0246983 | A1* | 8/2018 | Rathod | G06F 16/9566 |
| 2019/0266283 | A1* | 8/2019 | Shukla | G06N 20/00 |
| 2020/0218413 | A1* | 7/2020 | VanDuyn | G06F 3/04842 |

* cited by examiner

≡ MENU     CAVSWIN0118PX     *enter search criteria...* 🔍

CREATED
JANUARY 18, 2016 6:23PM
DAVID GARTH

LAST MODIFIED
JANUARY 18, 2016 6:33PM
DAVID GARTH

EDITION
WEDNESDAY, JANUARY 18, 2016

SECTION
TOP NEWS

GROUPING
NONE

} — 1810

NOTES

Lorem ipsum dolor sit amet, consectetur adipiscing elit. Aliquam eget feugiat purus. Nullam congue dictum tortor, in consequat nulla gravida non.

STATUS
DRAFT ▼

↻ VALIDATE STORY ← 1822

CONTENT [EDIT]
- The story has no slug assigned Fix this error
- The story is blank Fix this error
- The kicker, headline, subhead and billboard are blank Fix this error
- The author is blank Fix this error
- The kicker, headline, subhead or billboard does not match the source Fix this error
- The author does not match the source Fix this error
- One or more images is missing a credit Fix this error LAYOUT [EDIT]
- The cover image has not been selected Fix this error TEMPLATE OPINION [EDIT]
- ✓ No errors found SHARE SITE [EDIT]
- The share site hero image has not been selected Fix this error
- The social image has not been selected Fix this error
- The social title is blank Fix this error
- The social description is blank Fix this error MOBILE LAYOUT [EDIT]
- Does not contain a mobile version Fix this error

} — 1820

↩ EXIT TO EDITION    USERS VIEWING THIS STORY (DG)(MK)(BH)    Last Saved: 5 mins ago 💾 SAVE

| 1910 | CONTENT | 1912 → LAYOUT > |

COPY | IMAGES ③ | VIDEOS ① | AUDIO | DOCUMENTS | WEBLINKS | RICH CONTENT

ORIGINAL ← 1920
CURRENT ← 1930

SLUG
CAVWIN0118PX

SLUG
CAVWIN0118PX

KICKER

KICKER

HEADLINE

HEADLINE
James and Cavaliers win thrilling Game 7, 93-89

SUBHEAD

SUBHEAD

READ OUT/BILLBOARD

READ OUT/BILLBOARD

BYLINE
By John Doe

BYLINE
By News Service

AUTHOR
John Doe, Bill Smith

BODY

BODY
Aa  ⊕ QUICK PREVIEW

OAKLAND, Calif. --LeBron James cradled the shiny gold trophy and struggled to sum up what might be his sweetest championship yet, the one he is so proudly bringing home to his native northeast ohio just as he promised to do when he returned to the Cavaliers two summers ago. Later, flanked by his three children on Father's Day, a cigar between his lips and winning net as necklace with the lingering stench of champange, James began to understand the magnitude of his accomplishment for Cleveland after a half-century wait.

"I'm coming home with what I said I was going to do, "he said, adding, "I can't wait to get off that plane, hold that trophy up and see all our fans at the terminal"

James delivered on a vow to his home state and brought the Cavs back from the brink as they became the first team to rally from a 3-1 finals deficit, beating the defending champion Golden State Warriors 93-89 on Sunday night to end a 52-year major sports championship drought in Cleveland.

"I've never seen a man in my life tell an entire state. 'Get on my back, I got

LeBron James cradled the shiny gold trophy and struggled to sum up what might be his sweetest championship yet, the one he is so proudly bringing home to his native northeast ohio just as he promised to do when he returned to the Cavaliers two summers ago. Later, flanked by his three children on Father's Day, a cigar between his lips and winning net as necklace with the lingering stench of champange, James began to understand the magnitude of his accomplishment for Cleveland after a half-century wait.

[pullquote] "I'm coming home with what I said I was going to do. I can't wait to get off that plane, hold that trophy up and see all our fans at the terminal. "[/pullquote]

James delivered on a vow to his home state and brought the Cavs back from the brink as they became the first team to rally from a 3-1 finals deficit, beating the defending champion Golden State Warriors 93-89 on Sunday night to end a 52-year major sports championship drought in Cleveland.

"I've never seen a man in my life tell an entire state. 'Get on my back, I got

↶ EXIT TO EDITION | USERS VIEWING THIS STORY (DG)(MK)(BH) | Last Saved: 5 mins ago 💾 SAVE

| 1910 | CONTENT | LAYOUT > |
|---|---|---|
| | COPY  IMAGES (3)  VIDEOS (1)  AUDIO  DOCUMENTS  WEBLINKS  RICH CONTENT | |

ORIGINAL  2010  CURRENT  2020

Image

SLUG: CAVWINIMAGE1
DEFAULT CREDIT: John Doe

SLUG: CAVWINIMAGE1
CREDIT: John Doe

DEFAULT CAPTION
Lorem ipsum dolor sit amet, consectetur adipiscing elit. Aliquam eget feugiat purus. Nullam congue dictum tortor, in consequat nulla gravida non. Pellentesque dapibus, lectus eget pellentesque eleifend.

CAPTION
Lorem ipsum dolor sit amet, consectetur adipiscing elit. Aliquam eget feugiat purus. Nullam congue dictum tortor, in consequat nulla gravida non.

Image

SLUG: CAVWINIMAGE2
DEFAULT CREDIT: John Doe

SLUG: CAVWINIMAGE2
CREDIT: John Doe

DEFAULT CAPTION
Lorem ipsum dolor sit amet, consectetur adipiscing elit. Aliquam eget feugiat purus. Nullam congue dictum tortor, in consequat nulla gravida non. Pellentesque dapibus, lectus eget pellentesque eleifend.

CAPTION
Lorem ipsum dolor sit amet, consectetur adipiscing elit. Aliquam eget feugiat purus. Nullam congue dictum tortor, in consequat nulla gravida non.

Image

SLUG: CAVWINIMAGE3
DEFAULT CREDIT: John Doe

SLUG: CAVWINIMAGE3
CREDIT: John Doe

DEFAULT CAPTION

CAPTION

EXIT TO EDITION  USER VIEWING THIS STORY (DG) (MK) (BH)  Last Saved: 5 mins ago  SAVE

Summary

Tablet Budget
Top News
Sports
Local News
Opinion
A&E
Life
Business

Mobile Budget

Obituaries

Performance ← 2810

WEDNESDAY
JANUARY 18, 2016

| POSITION | SLUG | TYPE | VIEWS | AVG. DURATION | CLICK-THROUGH RATE |
|---|---|---|---|---|---|
| 1.1 | BREXIT_CVR_0118PX | MULTI-STORY COVER | 10,256 | 0:15 | - |
| 1.1 | BREXIT_PT1_0118PX | MODULAR STORY | 9,588 | 1:13 | - |
| 1.2 | BREXIT_PT2_0118PX | PHOTO GALLERY | 8,964 | 2:54 | - |
| 2 | TRUMPGAFFE0118PX | VIDEO GALLERY | 11,987 | 6:45 | - |
| 3 | TOLEDOZOO | FULLSCREEN AD | 6,549 | 0:21 | 3.4% |
| 4 | STATEBUDGET0118PX | HALF BASIC STORY | 8,896 | 3:29 | - |
| 5 | PROMEDICA0118PX | HALF AD | 7,685 | 0:36 | 2.5% |
| 6 | LOREMIPSUM | MODULAR STORY | 10,698 | 4:51 | - |
| 7 | LOREMIPSUM | PHOTO GALLERY | 6,458 | 5:32 | - |
| 8 | CLINTON0118PX | ANCHOR-STORY | 4,365 | 2:18 | 1.6% |
| 9 | LOREMIPSUM | FULL SCREEN AD | 2,985 | 0:46 | - |

More Stories ← 2820

BREAKING NEWS

| SLUG | PUBLISH STATUS | NOTIFICATION SENT | CREATED | LAST MODIFIED | ACTION |
|---|---|---|---|---|---|
| | | | | | Create |
| BREAKINGTRUMP0181PX | UNPUBLISHED | NO | 01/11/2016 DAVID GARTH | 01/11/2016 DAVID GARTH | View / Edit |
| BREAKINGLOREM123123AB | PUBLISHED | NO | 01/11/2016 DAVID GARTH | 01/11/2016 DAVID GARTH | View / Edit |
| BREAKINGIPSUM1232SD | PUBLISHED | YES | 01/11/2016 DAVID GARTH | 01/11/2016 DAVID GARTH | View / Edit |
| BREAKINGDOLOR232DS | | | | | |
| BREAKINGSITAMET234KL | | | | | |
| BREAKINGLOREM1343AB | | | | | |
| BREAKINGIPSUM3432SD | | | | | |
| BREAKINGDOLOR3432DS | | | | | |
| BREAKINGSITAMET2567KL | | | | | |

SELECT STORY

SOURCE: LIBERCUS-PRINT

| STORY SLUG | PUBLISH DATE | AUTHOR | LAST MODIFIED |
|---|---|---|---|
| CAVSWIN0118PX | January 18, 2016 | John Smith | January 17, 2016 |
| BREXIT0118PX | January 18, 2016 | John Smith | January 17, 2016 |
| TRUMPGAFFE0118PX | January 18, 2016 | John Smith | January 17, 2016 |
| TOLEDOZOO | January 18, 2016 | John Smith | January 17, 2016 |
| STATEBUDGET0118PX | January 18, 2016 | John Smith | January 17, 2016 |
| CLINTONEMAILS0118PX | January 18, 2016 | John Smith | January 17, 2016 |

More Stories

< BACK    SELECT STORY >

PERFORMANCE

LOREM IPSUM CAMPAIGN

WEDNESDAY, JANUARY 18, 2017 (PUBLISHED: 01/18/17)

| POSITION | SECTION | SLUG | TYPE | VIEWS | AVG. DURATION | CLICK-THROUGH RATE |
|---|---|---|---|---|---|---|
| 2 | TOP NEWS | TOLEDOZOO | FULLSCREEN AD | - | - | - |
| 5 | TOP NEWS | TOLEDOZOO | FULLSCREEN AD | 8,896 | 0:23 | 3.2% |
| 8 | SPORTS | TOLEDOZOO | FULLSCREEN AD | 7,685 | 0:30 | 2.5% |
| 15 | A&E | TOLEDOZOO | FULLSCREEN AD | 10,698 | 0:22 | 3.1% |
| 23 | BUSINESS | TOLEDOZOO | FULLSCREEN AD | 6,458 | 0:15 | 2.4% |

TUESDAY, JANUARY 17, 2017 (PUBLISHED: 01/17/17)

| POSITION | SECTION | SLUG | TYPE | VIEWS | AVG. DURATION | CLICK-THROUGH RATE |
|---|---|---|---|---|---|---|
| 2 | TOP NEWS | TOLEDOZOO | FULLSCREEN AD | - | - | - |
| 5 | TOP NEWS | TOLEDOZOO | FULLSCREEN AD | 8,896 | 0:23 | 3.2% |
| 8 | SPORTS | TOLEDOZOO | FULLSCREEN AD | 7,685 | 0:30 | 2.5% |
| 15 | A&E | TOLEDOZOO | FULLSCREEN AD | 10,698 | 0:22 | 3.1% |
| 23 | BUSINESS | TOLEDOZOO | FULLSCREEN AD | 6,458 | 0:15 | 2.4% |

MONDAY, JANUARY 16, 2017 (PUBLISHED: 01/16/17)

✕ CLOSE

Fig. 34

METHOD OF PUBLISHING AND DELIVERING AN ELECTRONIC NEWSPAPER

CROSS-REFERENCE TO RELATED APPLICATIONS

This application is a continuation of the co-pending U.S. patent application Ser. No. 16/948,916 filed Oct. 6, 2020, which application is a continuation of the U.S. patent application Ser. No. 16/146,382 filed Sep. 28, 2018 that issued as the U.S. Pat. No. 10,872,126 on Dec. 22, 2020.

FIELD OF THE INVENTION

The present invention relates generally to a system and method for conveying information to a user. In particular, the invention is directed to a system of publishing software and corresponding mobile applications with advanced features for editing and publishing an electronic newspaper which is optimized for viewing on mobile devices such as tablets and smart phones.

BACKGROUND OF THE INVENTION

The capabilities of smart phones and tablet devices (collectively, mobile devices) have increased dramatically since they were first introduced. Coincident with the improvements in mobile device capability, people's preferences for how they receive information and entertainment have changed. Many people now use mobile devices for watching movies and TV shows, and for reading books and periodicals, along with the inherent communication and computing functions of the devices.

As people began to desire to receive and consume information digitally on mobile devices, publishers recognized the need to produce electronic or digital versions of their publications, such as newspapers, magazines and books. Whereas electronic books can be published once and never revised, periodicals such as newspapers inherently contain ever-changing information. This led to a blurring of the lines between producing an "edition" of a publication (such as daily or monthly) and simply putting stories on a website for people to view if/when they wish.

It is known in the art and widely practiced by newspaper publishers to host an Internet website containing many of the same stories, pictures and advertisements as contained in their printed newspaper. These newspaper websites typically publish stories as soon as they are written and available, which may be before the same story appears in the printed newspaper the following morning. Furthermore, stories published on newspaper websites often remain on the website for two or more days, usually moving from a "front page" or prominent location on the website to a less-visible location in a subsection after the first day. These newspaper websites are effective at publishing stories online, but many readers prefer the concept of a daily newspaper edition, which the newspaper websites lack.

It is also known in the art to publish electronic newspapers which are page-by-page replicas of the printed newspaper for each daily edition. This type of system allows users to retain the familiar concept of a daily newspaper with unique content, while allowing the users to view the newspaper on a tablet device and thereby avoid the need for an actual physical paper. One such system is described in U.S. patent application Ser. No. 15/006,466, titled "ELECTRONIC NEWSPAPER", filed Jan. 26, 2016, which is commonly owned with the present application, and which is hereby incorporated by reference in its entirety.

A need has now been recognized for a new and better way of electronically publishing a newspaper, where the familiar paradigm of the daily edition with multiple sections is retained, and advanced electronic features such as videos and interactivity are supported, all while delivering the user convenience of viewing the electronic newspaper on mobile devices such as smart phones and tablets.

SUMMARY OF THE INVENTION

In accordance with the teachings of the present invention, a computer system is disclosed for preparing and delivering digital information, particularly digital newspaper editions, to mobile application users. The system includes mobile applications (apps) for both mobile phone and tablet devices, with content display and interactivity of each app optimized for the particular device type. The system also includes a suite of back-office software modules which allow writers and editors to prepare stories, images and other content for delivery to the apps. One such module is a story creator, which includes an interface to a content management system, allowing plain text stories and raw images to be imported, formatted and made interactive for delivery to the apps. The story creator also includes interfaces to providers of data such as obituaries, classified ads and weather, and functionality for publishing daily editions of the digital newspaper using the imported content. Other features of the system include breaking news alerts, paywall integration, and interfaces to social media.

BRIEF DESCRIPTION OF THE DRAWINGS

The above, as well as other advantages of the present invention will become readily apparent to those skilled in the art from the following detailed description of the preferred embodiment when considered in the light of the accompanying drawings in which:

FIG. 18 is an illustration of a web page in Story Creator for viewing a summary of a NewsSlide story;

FIG. 19 is an illustration of a web page in Story Creator for creating and editing copy in a NewsSlide story;

FIG. 20 is an illustration of a web page in Story Creator for creating and editing images in a NewsSlide story;

FIG. 26 is an illustration of a web page in Story Creator for publishing a NewsSlide edition, including an overlay for a final confirmation of the publish action;

FIG. 28 is an illustration of a web page in Story Creator for viewing performance data for a published NewsSlide edition;

FIG. 29 is an illustration of a web page in Story Creator for selecting an entry in a Content Management System to use as a Breaking News story in NewsSlide;

FIG. 30 is an illustration of a web page in Story Creator for creating and editing copy in a Breaking News story in NewsSlide;

FIG. 34 is an illustration of a web page in Story Creator for viewing performance data for an ad campaign for the published NewsSlide editions in which the ad appears;

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Soon after the advent of the Internet and web-based information delivery, newspaper publishers began producing web sites where stories and other content from their newspapers could be made available online. Electronic newspaper systems have also been developed which allow a user to view a digital replica of a printed newspaper on an electronic device such as a computer or tablet with a web browser, as described in the ELECTRONIC NEWSPAPER patent application mentioned above. However, with the rapid shift of user preference to mobile devices such as tablets and smart phones, and the rapid increase in capabilities of those devices, a need for an entirely new delivery platform has been identified. The new electronic newspaper delivery platform, disclosed herein, is optimized for viewing and interaction by users of such mobile devices.

Figure 1:
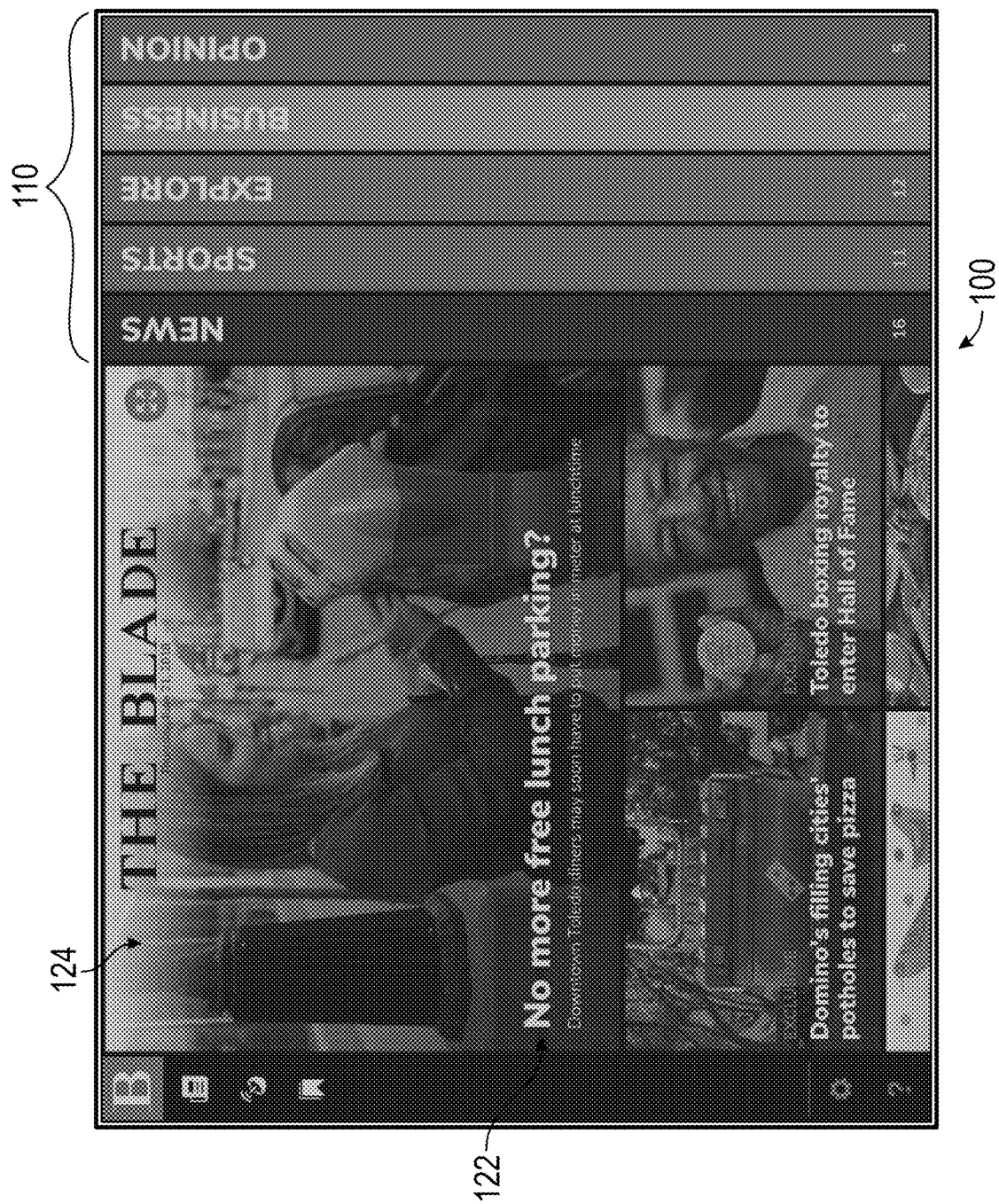
FIG. 1 is an illustration of a screen shot from a tablet device displaying a launch page of a new electronic newspaper delivery platform known as NewsSlide, according to embodiments of the present disclosure.

FIG. 1 is an illustration of a screen shot 100 from a tablet device displaying a launch page of a new electronic newspaper delivery platform, according to embodiments of the present disclosure. The electronic newspaper delivery platform is embodied as a family of applications ("apps") known as NewsSlide. Some prominent features of the NewsSlide tablet device user interface are apparent in FIG. 1—including the use of color-coded section bars 110 (for News, Sports, etc.) which may be expanded to display the stories in each section, and the use of a headline 122 and a picture 124 to identify each story. The NewsSlide tablet app user interface will be discussed in detail later.

Figure 2:
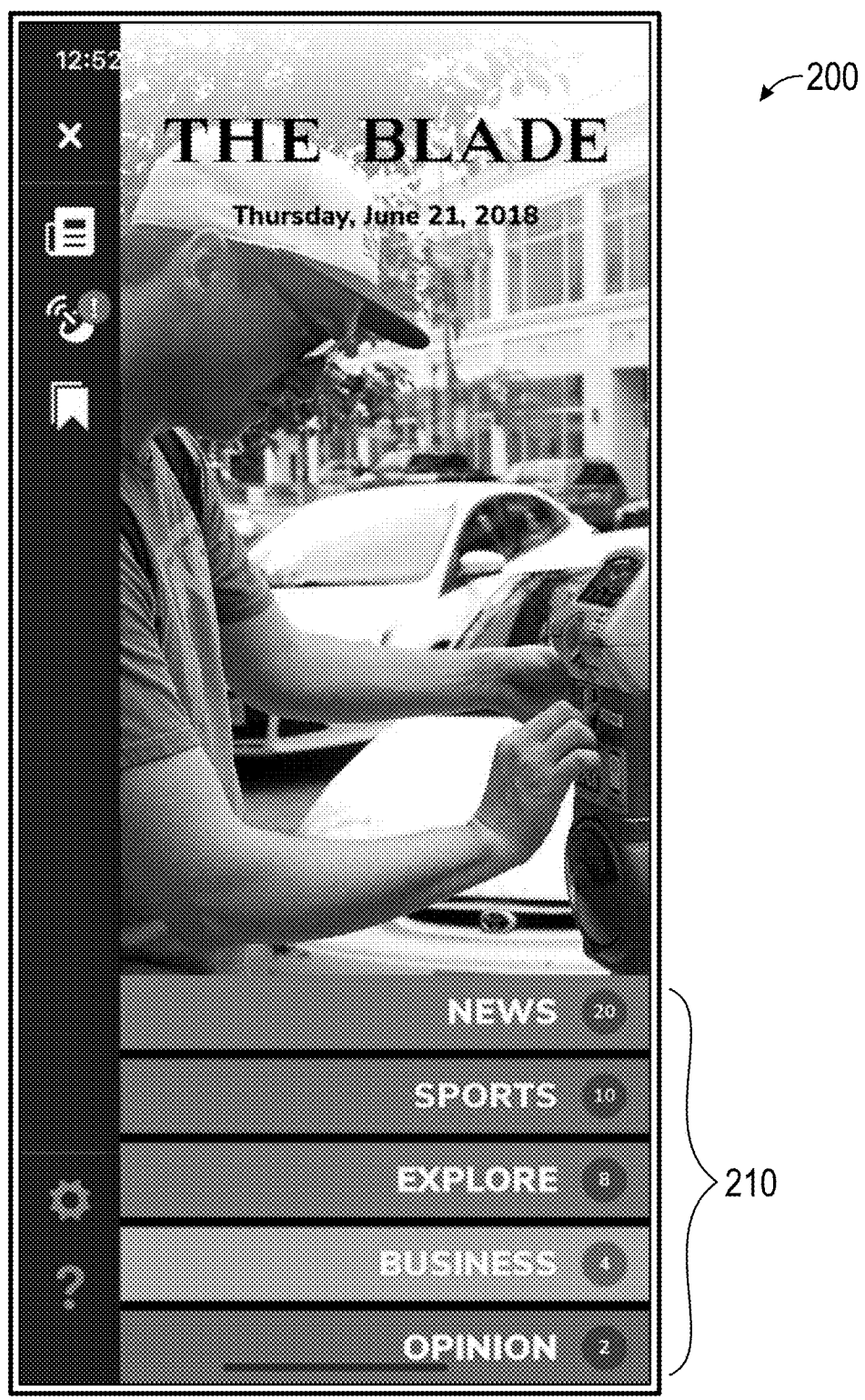
FIG. 2 is an illustration of a screen shot from a smart phone device displaying a launch page of the NewsSlide electronic newspaper delivery platform, according to embodiments of the present disclosure.

FIG. 2 is an illustration of a screen shot 200 from a smart phone device displaying a launch page of the NewsSlide electronic newspaper delivery platform, according to embodiments of the present disclosure. It is apparent in FIG. 2 that the NewsSlide smart phone app has a similar look and feel to the NewsSlide tablet app, although there are some differences necessitated by screen size and aspect ratio. For example, section bars 210 are arranged differently on the smart phone app, and the section bars 210 behave differently as will be discussed later as part of a discussion of the NewsSlide smart phone app user interface.

Figure 3:
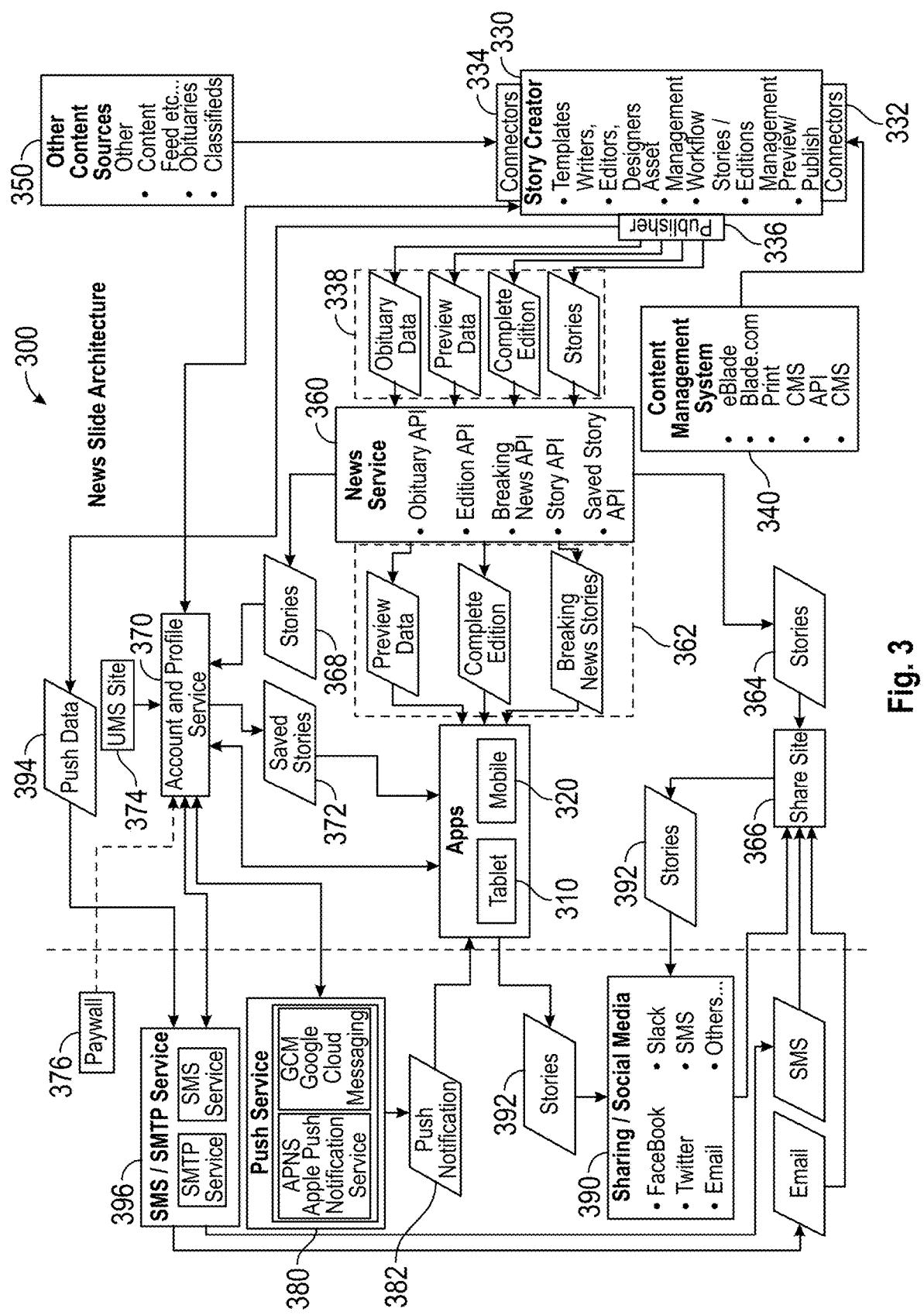
FIG. 3 is a schematic diagram illustrating the NewsSlide publishing architecture, including the various components and their connectivity.

Aside from the tablet and smart phone apps mentioned briefly above, NewsSlide also includes a suite of back-office software used to publish the daily editions to the apps. FIG. 3 is a schematic diagram 300 illustrating the NewsSlide publishing architecture, including various back-office software components and their connectivity to each other and to the apps, according to embodiments of the present disclosure.

A tablet app 310 and a mobile (smart phone) app 320, as depicted in FIGS. 1 and 2, respectively, are located at the left-center of FIG. 3. The apps 310 and 320 are used by the consumer or "user" who wishes to read the news stories. To the right of the apps 310 and 320 in FIG. 3 are various back-office software modules which are used to create and publish editions to the app. A Story Creator module 330 is the centerpiece of the NewsSlide architecture 300. Story Creator is used by writers and editors to prepare stories, advertisements ("ads") and other content for publishing in the NewsSlide apps 310-320.

The Story Creator module 330 includes a connector 332 for interfacing with a Content Management System 340. The Content Management System 340 serves as a source of material, such as stories, pictures, videos and ads used in the Story Creator module 330. The Story Creator module 330 also includes a connector 334 for interfacing with other content sources 350. The other content sources 350 include content not owned or produced by a typical newspaper, but rather by third-party companies. Examples of the other content sources 350 include obituaries, classified ads, weather data, traffic data, etc. Although it is shown as a single box in FIG. 3, different companies and electronic systems may provide each of the items in the other content sources 350.

The Story Creator module 330 includes a publisher 336 used to publish complete editions, stories and other data, shown collectively at 338, to a News Service module 360. The News Service module 360 includes several application programming interfaces (APIs) which receive the items 338, and prepare and deliver them for their actual consumption downstream. The News Service module 360 is an automated program which requires no interaction by a user such as an editor. The News Service module 360 compiles the items 338 into complete editions, breaking news stories and preview data, shown collectively at 362, for download into the apps 310-320 on individual user devices. In addition to compiling the items 362, the News Service module 360 also crops and sizes the items 362 based on the resolution of the user devices.

The News Service module 360 also outputs stories 364 to a share site 366, from which the stories 364 may be requested and retrieved by other websites and apps such as social media platforms and messaging services, as discussed below. The News Service module 360 further outputs stories 368 for interface with an account and profile service module 370. Through the account and profile service module 370, an individual user may create saved stories 372 for future reference. A user management system (UMS) 374 provides user login services and interoperates with the account and profile service module 370, both for public users of the apps 310-320 and for newspaper publisher users of the Story Creator module 330.

To the left of the dotted vertical line in FIG. 3, a paywall 376 may be integrated with the account and profile service module 370 to allow the newspaper publisher to incorporate revenue collection into the NewsSlide architecture. For example, some basic features and content of the apps 310-320 may be available to any user free of charge, while other advanced features and content may be available only to those users who have paid for a subscription.

A push services box 380, including Apple Push Notification Service (APNS) and Google Cloud Messaging, allows push notifications 382 to be sent to the apps 310-320, which themselves support both Apple (iPhone/iPad) and Google/Android devices. The push services box 380 interfaces with the account and profile service module 370 to allow push notification configuration on an individual user basis.

A sharing/social media box 390 includes popular platforms such as FaceBook and Twitter. Stories 392 can be shared to these social media platforms, or via email or other services. Users can share the stories 392 to the social media platforms 390 directly from the apps 310-320, or the newspaper publisher can send push data 394 from the Story Creator module 330 to an SMS/SMTP Service box 396, where a message is sent to the share site 366, causing the story/stories 392 to be sent to the social media platforms 390.

The NewsSlide architecture diagram 300 of FIG. 3 illustrates many different software modules and applications, and their interconnectivity. The apps 310-320 of course run on mobile devices (phones and tablets) owned by individual end users. The other elements depicted to the right of the dotted line on FIG. 3 are NewsSlide-related back office programs running on one or more servers privately controlled by the newspaper publisher. The elements depicted to the left of the dotted line are public domain or commercially available applications and services with which NewsSlide interfaces, and these left-side elements generally run on cloud servers. Of the right-side elements, the following detailed discussion will focus primarily on the Story Creator module 330 and the apps 310-320 themselves.

Figure 4:
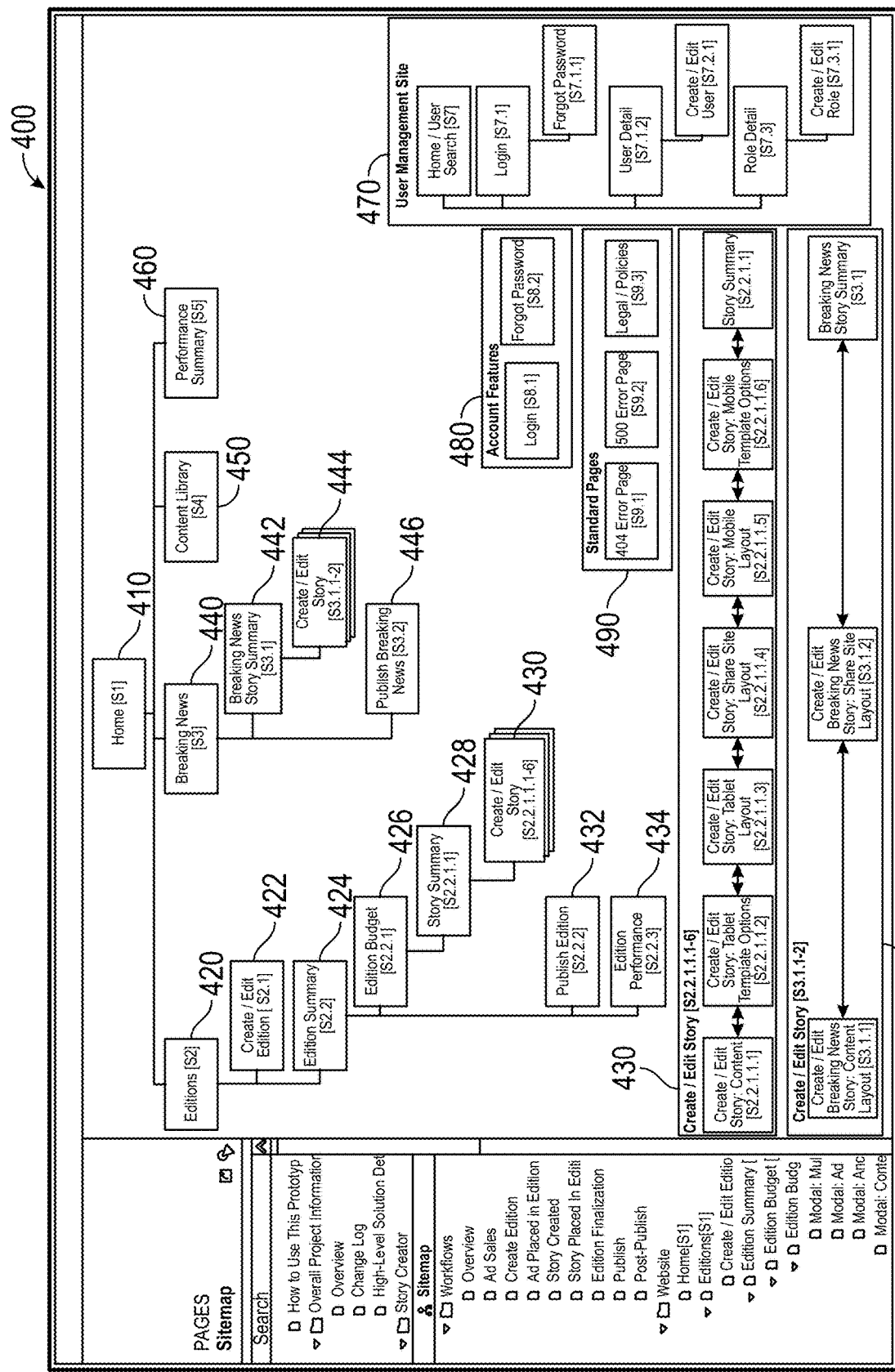
FIG. 4 is an illustration of a hierarchy of web pages contained in a Story Creator module of the NewsSlide publishing architecture.

FIG. 4 is an illustration 400 of a hierarchy of web pages contained in the Story Creator module 330 of the NewsSlide publishing architecture. In other words, the Story Creator module 330 uses a browser-based interface to provide features enabling individuals at the newspaper publisher—such as writers, editors and designers—the ability to write stories, integrate pictures and videos, incorporate ads, and layout and publish editions of NewsSlide. Many of the pages depicted in FIG. 4 will be discussed in detail below, beginning with the discussion of FIG. 12. In one embodiment as discussed, a server computer serves web pages to client computers where newspaper employees use Story Creator to prepare stories and editions of NewsSlide. However, other embodiments may also be envisioned for delivering the Story Creator interface described below. Thus, the term "page" or "web page" in the discussion should be considered to generically represent a user interface screen.

A home page 410 branches off to an editions page 420, a breaking news page 440, a content library page 450 and a performance summary page 460. The editions page 420 sits atop the hierarchy for much of the functionality of Story Creator, including a create/edit edition page 422 and an edition summary page 424. The edition summary page 424 leads to an edition budget page 426 (numbers, types and sizes of stories and ads to be included in an edition), a story summary page 428 and a create/edit story page 430. The sub-pages contained in the create/edit story page 430 are shown in the large horizontal box below, also labelled 430. A publish edition page 432 and an edition performance page 434 complete the hierarchy of the editions page 420.

The breaking news page 440 is a separate entity because breaking news is published independent of daily editions of NewsSlide. The breaking news page 440 includes in its hierarchy some features and capabilities similar to those found in the editions hierarchy. A breaking news story summary page 442 leads to a create/edit breaking news story page 444. The sub-pages contained in the create/edit breaking news story page 444 are shown in the large horizontal box below, also labelled 444. A publish breaking news page 446 is the final step in the breaking news hierarchy.

A content library page 450 provides viewing of content such as stories, ads, images and videos from the Content Management System 340. A performance summary page 460 provides performance data, such as number of views and average viewing time for stories and ads, and click-through percentage for ads. A user management site hierarchy 470, which corresponds with the UMS 374 of FIG. 3, along with account features pages 480, provide user management functionality such as login, password maintenance, user roles and role details. Standard pages 490 include a "404 Error page" (server cannot find what was requested), a "500 Error page" (general problem) and legal/policy definition pages.

As mentioned above, many of the pages depicted in the hierarchy shown on FIG. 4 will be discussed in detail below, beginning with the discussion of FIG. 12.

In order to facilitate users performing various tasks in Story Creator, process workflow diagrams have been created, where these workflow diagrams define which Story Creator pages are used to perform the tasks, and in what order. The following seven figures illustrate the most significant of these process workflows.

Figure 5:
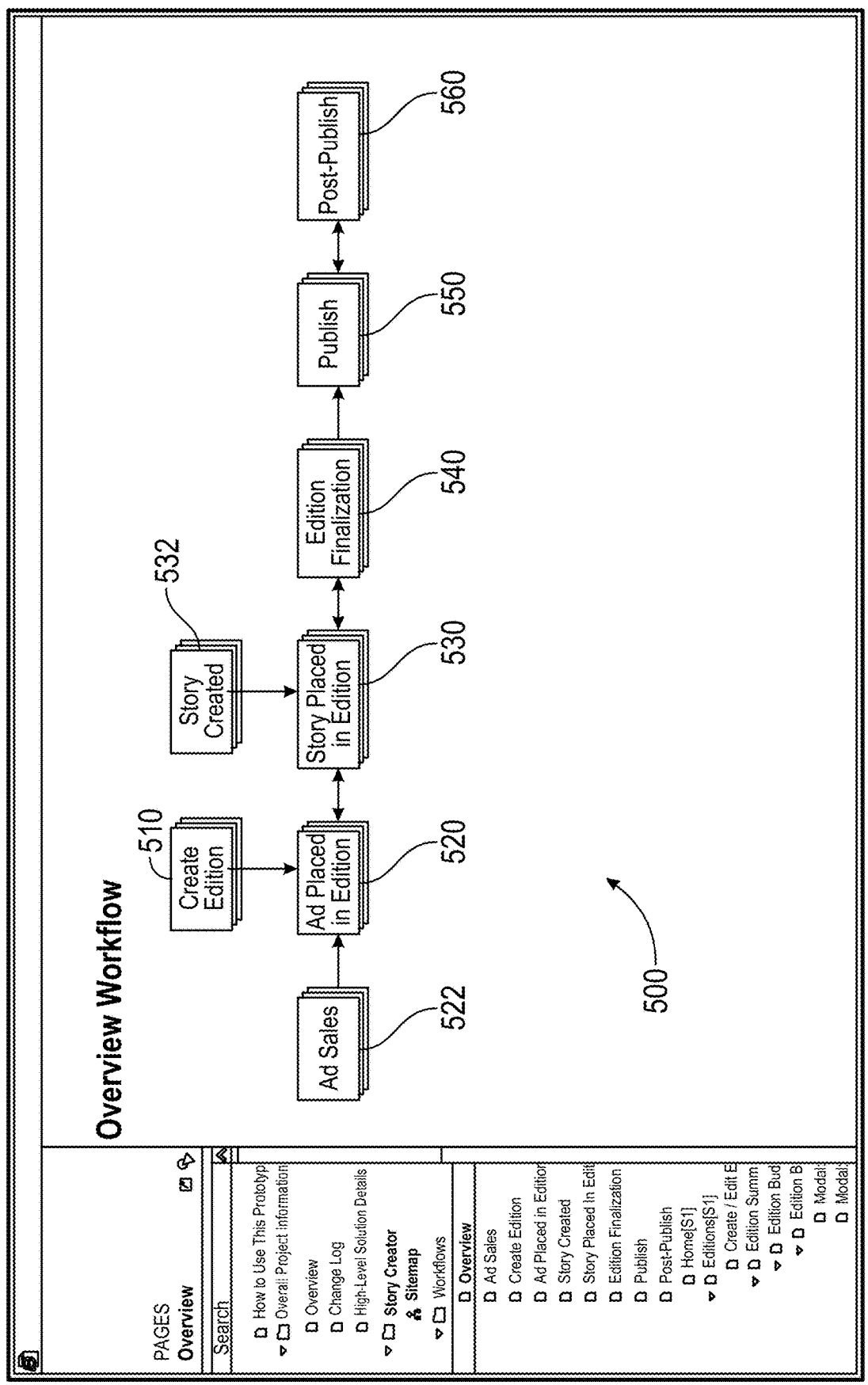
FIG. 5 is a workflow diagram showing an overview of the entire process followed in Story Creator for creating and publishing an edition of NewsSlide.

FIG. 5 is a workflow diagram 500 showing an overview of the entire process followed in Story Creator for creating and publishing an edition of NewsSlide. At block 510, a NewsSlide edition is created by an editor. The block 510, and many of the blocks in this and following workflow diagrams, may actually comprise multiple steps using several different application pages, as indicated by the multiple layers. At block 520, ads are placed in the NewsSlide edition, with ad sales being handled at block 522. At block 530, stories are placed in the NewsSlide edition, with story creation handled at block 532. The process of determining how many ads and how many stories are to be contained in edition is discussed below.

At block 540, the NewsSlide edition is finalized, which includes verifying that the budgeted number of stories and ads are met, no errors are found, the edition has appealing flow and formatting, etc. At block 550, the NewsSlide edition is published, meaning that the edition is pushed to the apps of all active mobile device users. At block 560, post-publish activities are performed, such as evaluating the number of times each story and ad are viewed.

Figure 6:
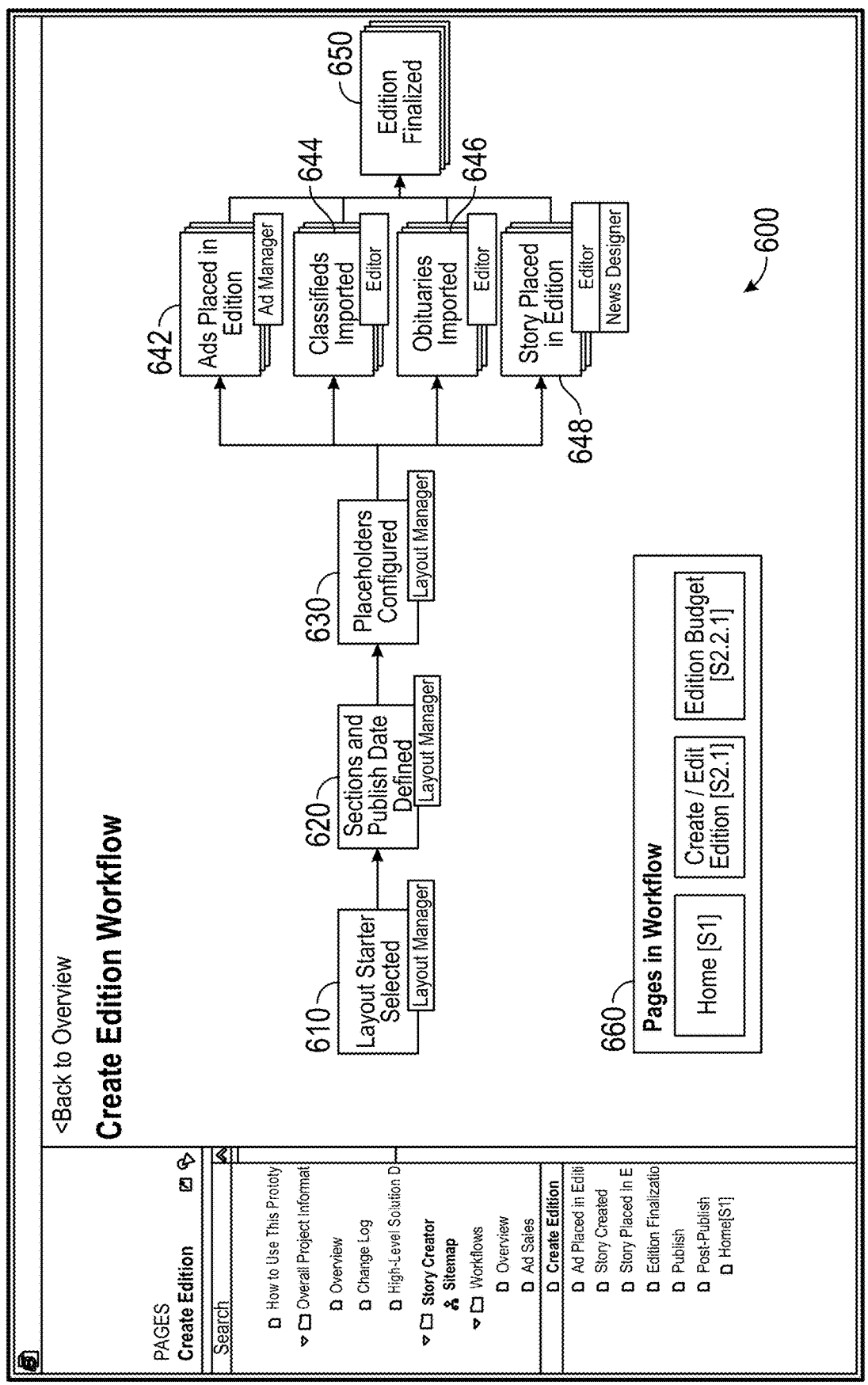
FIG. 6 is a workflow diagram showing the process in Story Creator for creating an edition of NewsSlide.

FIG. 6 is a workflow diagram 600 showing the process in Story Creator for creating an edition of NewsSlide. The diagram 600 provides detail for the block 510 of FIG. 5 discussed above. At block 610, a layout starter for the edition is selected by a layout manager. The starter is a template for the entire edition, as discussed later. At block 620, the sections to be included in the edition and the publish date of the edition are defined. This step begins to define the scope of the edition. At block 630, placeholder stories and ads are configured for the edition by the layout manager. At this point, the structure of the edition is defined—including numbers of stories in each section, number and type of ads included, and other data such as classified ads and obituaries.

At block 642, specific ads are placed in the edition. Ads are sold and prepared in advance, as discussed earlier. Thus, at the block 642, available ads of specified sizes (half page, full page, etc.) and types (static vs. interactive) are placed into the edition. At block 644, classified ads are imported into the edition, and at block 646, obituaries are imported into the edition. As mentioned earlier, classifieds and obituaries are provided by third-party content sources. At block 648, stories are placed in the edition. Stories are prepared by writers in Story Creator, and incorporated into the NewsSlide edition by someone such as an editor. Property data for each story—including story length, number of images and/or videos, interactive features, etc.—are available to the editor. At block 650, with all content placed, the NewsSlide edition is finalized, as discussed above.

Box 660 indicates which pages of the Story Creator system are used in the workflow of FIG. 6. Each of the workflow diagrams includes a similar box at the bottom. The pages in the box 660 were shown in the hierarchy illustration 400 of FIG. 4, and will be discussed in detail later.

Figure 7:
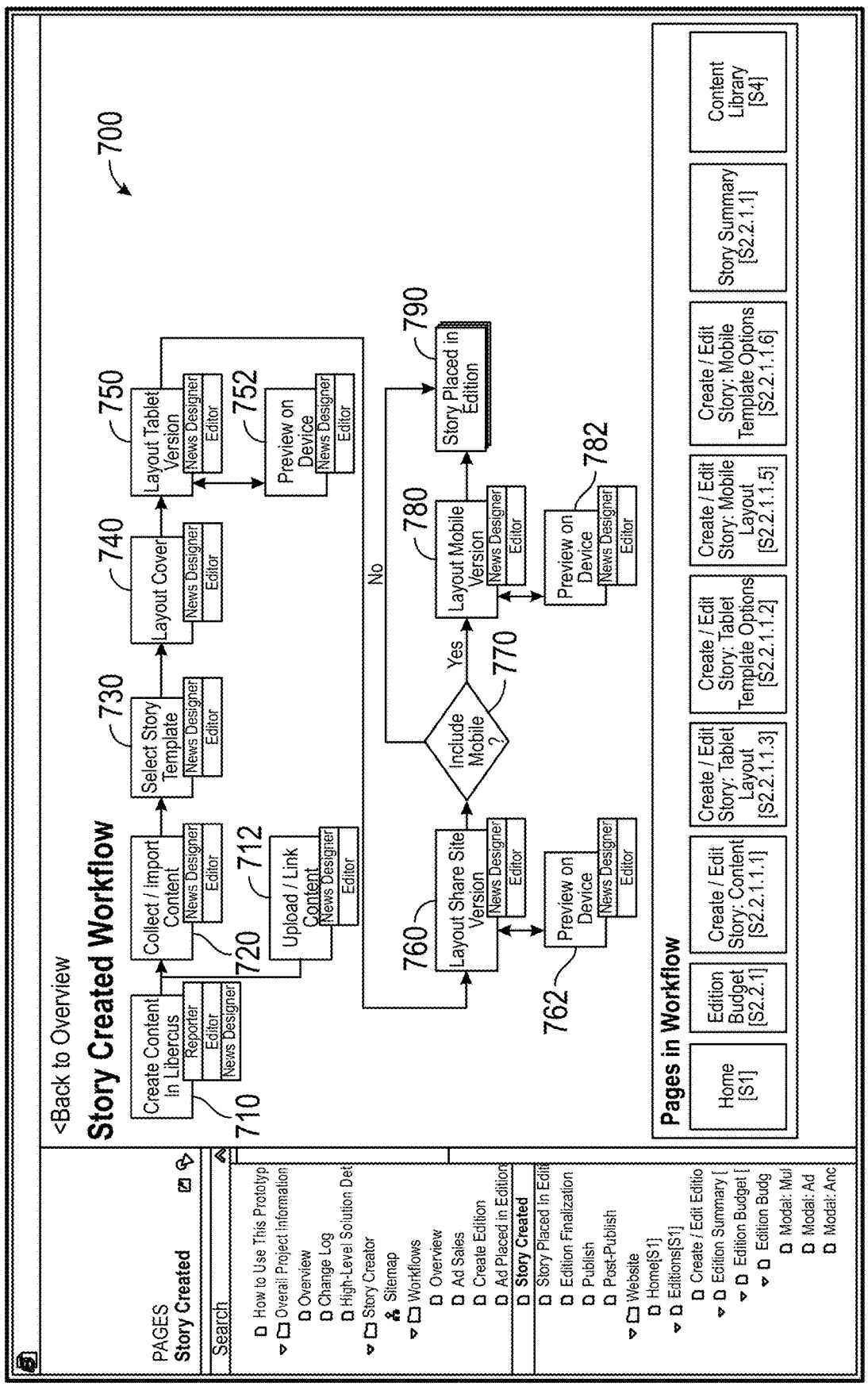
FIG. 7 is a workflow diagram showing the process in Story Creator for story creation.

FIG. 7 is a workflow diagram 700 showing the process in Story Creator for story creation. The diagram 700 provides detail for the block 532 of FIG. 5 discussed above. At block 710, reporters create content in Libercus, which is the Content Management System 340 of FIG. 3, as described in the ELECTRONIC NEWSPAPER patent application. The content (e.g., stories) created in Libercus includes the text of the story and any accompanying photos and videos. At block 712, content can be uploaded from other sources, such as the Associated Press. At block 720, content from either block 710 or 712 is collected and imported into Story Creator. At block 730, a template is selected for the story. At block 740, the story cover layout is designed. This includes selection of a story cover image, definition of the headline and sub-head, etc.

At blocks 750, 760 and 780, layout of the tablet version, the share site version and the mobile version of the story are performed. The layouts are different because of differences in the size and aspect ratio of the target display devices. The layouts are previewed on the appropriate devices at blocks 752, 762 and 782, respectively. The tablet and share site versions of each story are required. However, some stories may be omitted from the mobile (smart phone) version of the NewsSlide app. Thus, at decision diamond 770, it is determined whether the particular story will be included in the mobile app before proceeding to the block 780. At block 790, the completed story is placed into the edition.

Figure 8:
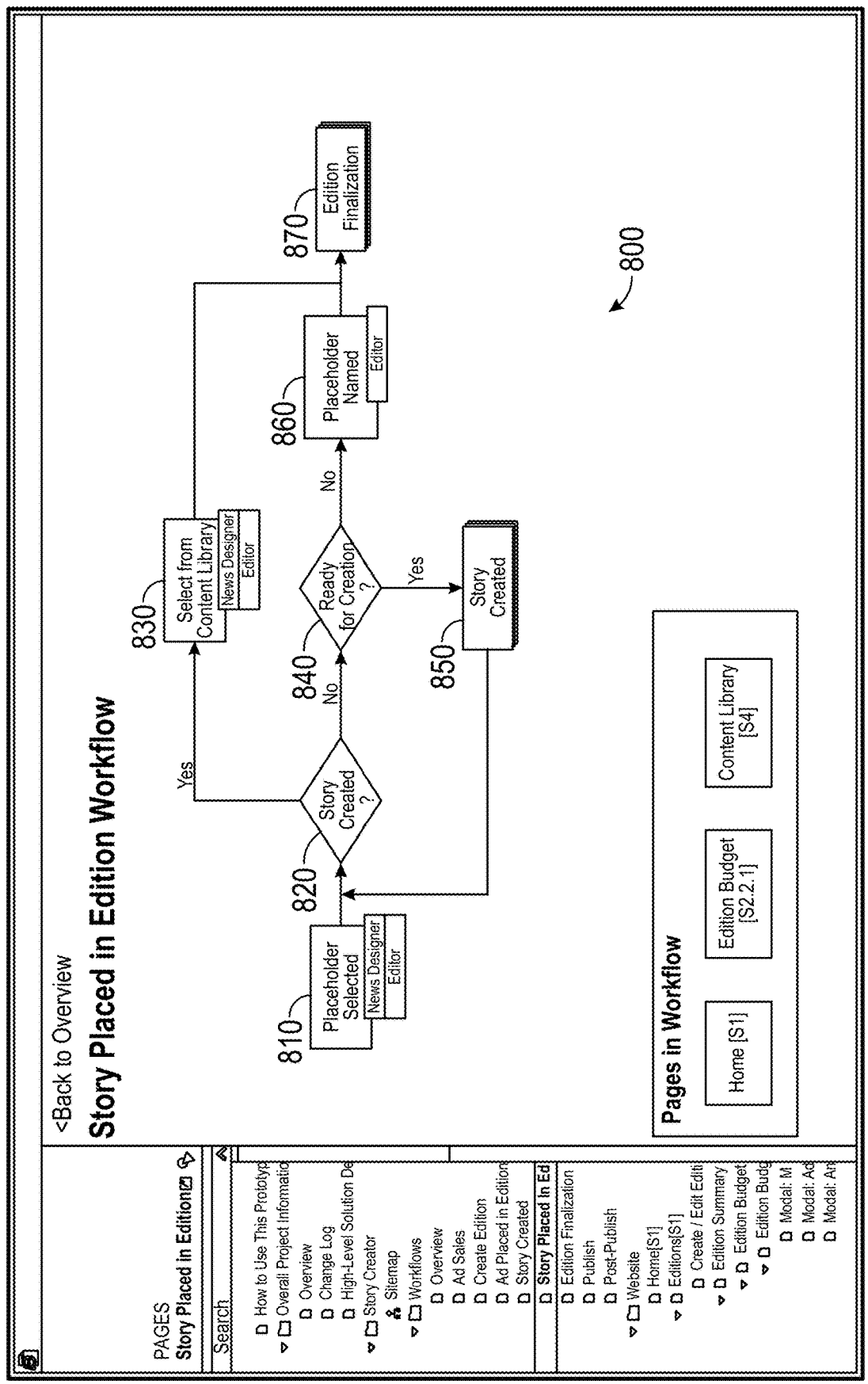
FIG. 8 is a workflow diagram showing the process in Story Creator for placing a story in a NewsSlide edition.

FIG. 8 is a workflow diagram 800 showing the process in Story Creator for placing a story in a NewsSlide edition. This step was shown at the block 530 of FIG. 5. The gist of the diagram 800 is that a story can be placed in an edition as a placeholder before the story is created. At block 810, the placeholder is selected. At decision diamond 820, it is determined whether the story has been created. If so, at block 830, the story content is selected from the Content Management System, and the story is placed in the edition, as discussed above. If the story has not been created at the decision diamond 820, then at decision diamond 840 it is determined whether the story is ready for creation. If so, then the story is created at block 850, and the process loops back to the decision diamond 820, where the answer will now be yes. If the story is not ready for creation at the decision diamond 840, then the placeholder is named at block 860, and the story placeholder is placed in the edition. At block 870, edition finalization is performed, as discussed next.

Figure 9:
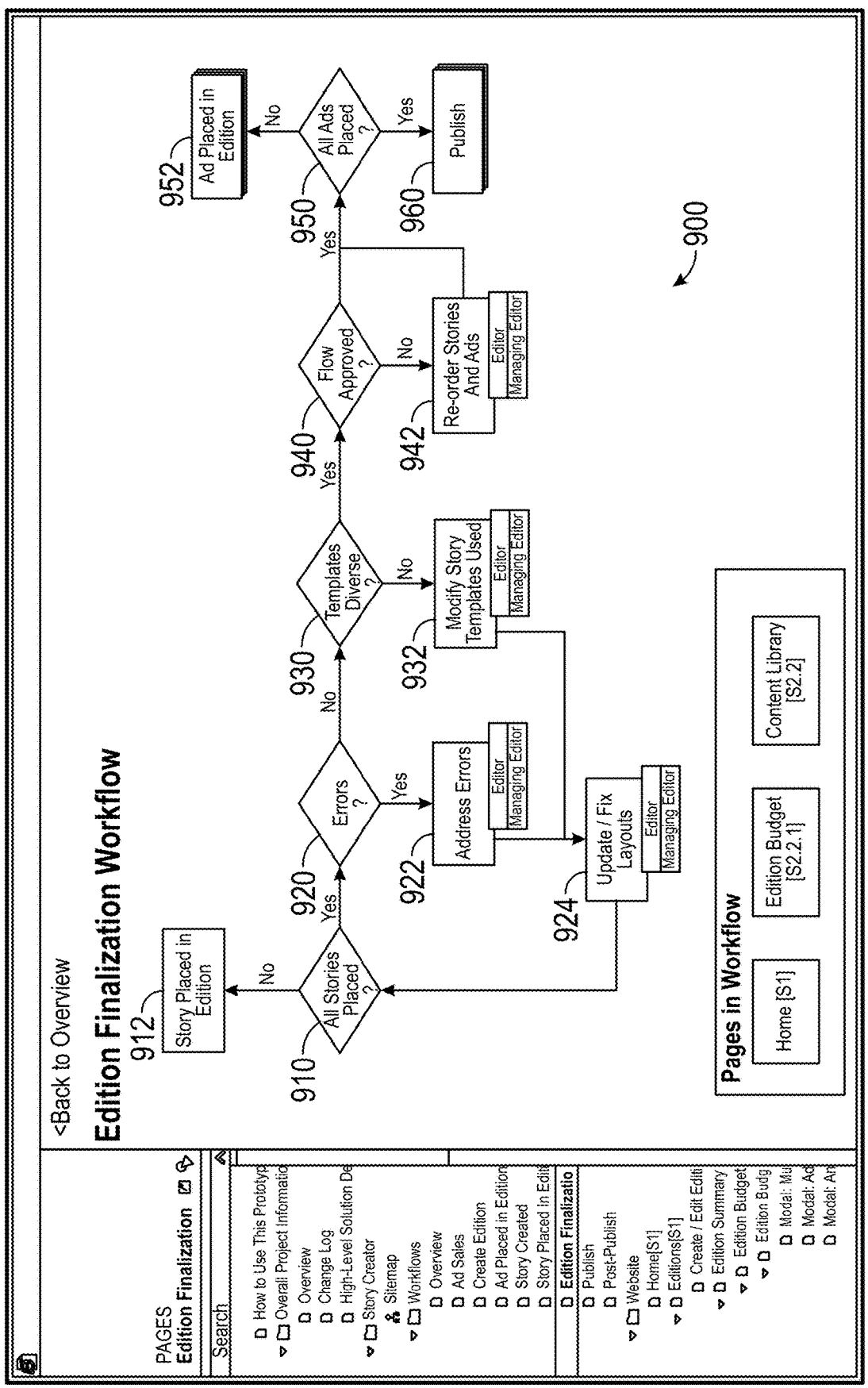
FIG. 9 is a workflow diagram showing the process in Story Creator for finalizing a NewsSlide edition.

FIG. 9 is a workflow diagram 900 showing the process in Story Creator for finalizing a NewsSlide edition. At decision diamond 910, it is determined whether all stories (as budgeted) are placed in the edition. If not, then at block 912, additional stories are placed in the edition as necessary, using the workflow described above. An error check is performed at decision diamond 920. Story Creator software includes advanced automated error checking, which provides editors with an indication of any problems. At block 922, any errors are addressed, and at block 924, layouts are updated or fixed as necessary based on the changes made at the block 922. The process then loops back to the decision diamond 910.

When no errors are detected at the decision diamond 920, the process moves to decision diamond 930 to determine if sufficient diversity is included in the templates used in the edition. Template types will be discussed later in reference to the Story Creator pages. If template diversity is not satisfactory, then at block 932, story templates are modified to achieve the desired diversity, and the process then reverts back to the block 924 for layout updates. When template diversity is satisfied, the flow of stories and ads is evaluated at decision diamond 940. Story Creator allows the editor to define a flow which includes the order of stories which appear when a user swipes through a section, and also where ads are placed in between stories. This flow is what is evaluated at the decision diamond 940. If the flow is not satisfactory, then stories and/or ads are reordered at block 942. This reordering does not require layout updates, so the process then proceeds to decision diamond 950 to determine if all ads which were included in the edition budget have been placed in the edition.

If all budgeted ads are not placed in the edition, then at block 952 additional ads are placed in the edition as needed, using a process similar to placing a story in an edition. When all budgeted ads are placed in the edition, the process moves to block 960 to publish the edition.

Figure 10:
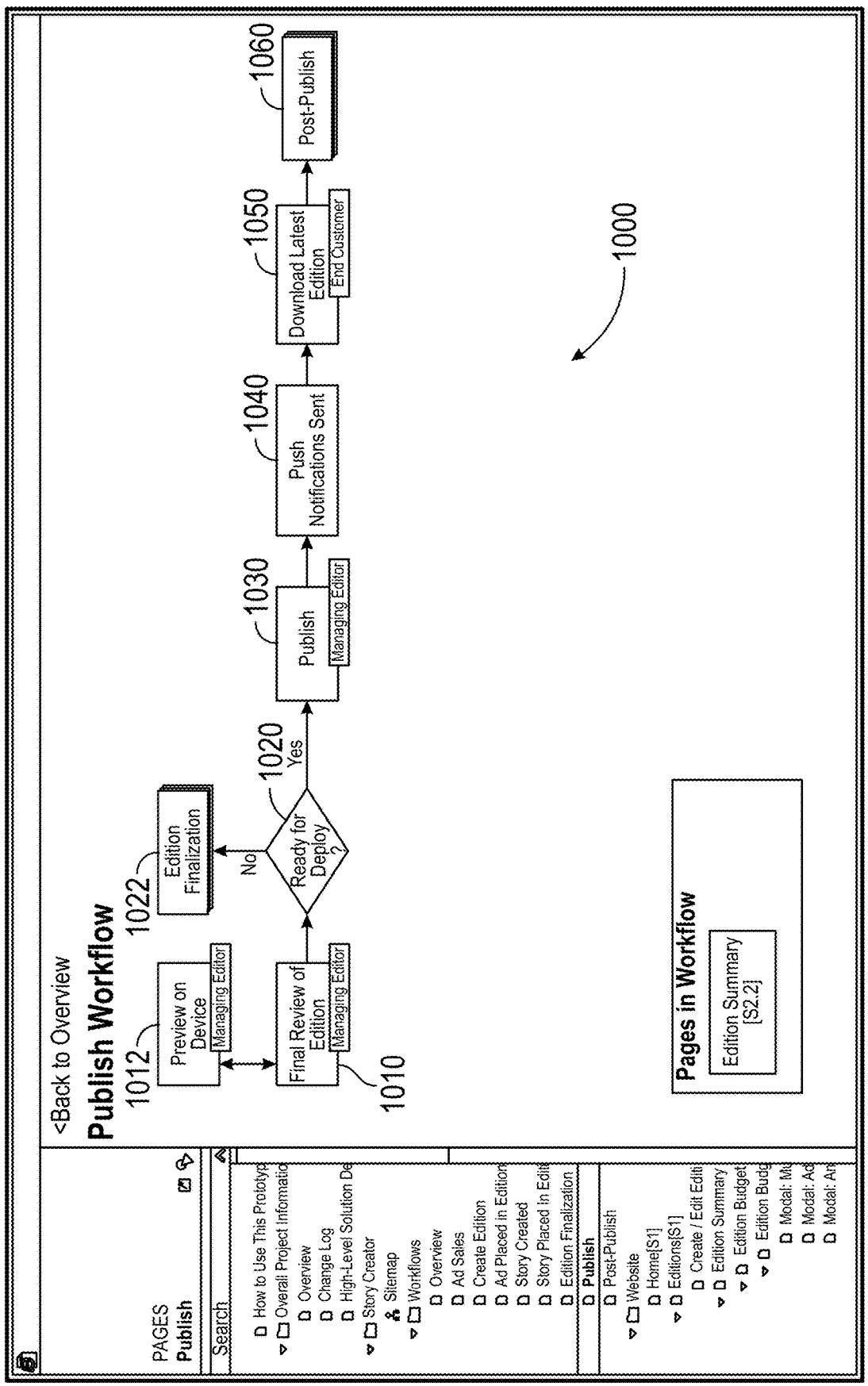
FIG. 10 is a workflow diagram showing the process in Story Creator for publishing a NewsSlide edition.

FIG. 10 is a workflow diagram 1000 showing the process in Story Creator for publishing a NewsSlide edition. This step was just encountered at the block 960 of FIG. 9. At block 1010, a final review of the edition is performed by a managing editor, including previewing the edition on a tablet and/or mobile device at block 1012. At decision diamond 1020, a final determination is made whether the edition is ready to deploy. If not, then the process reverts back to the edition finalization workflow of FIG. 9. When the edition is ready for deployment, it is published at block 1030, which causes Story Creator to send the items 338 to the News Service module, which in turn publishes the edition and stories to the apps 310-320.

At block 1040, push notifications for the edition are sent, as also seen on FIG. 3. At block 1050, end users download the latest edition into the apps 310-320 for viewing. At block 1060, the process moves on to post-publish activities, discussed below.

Figure 11:
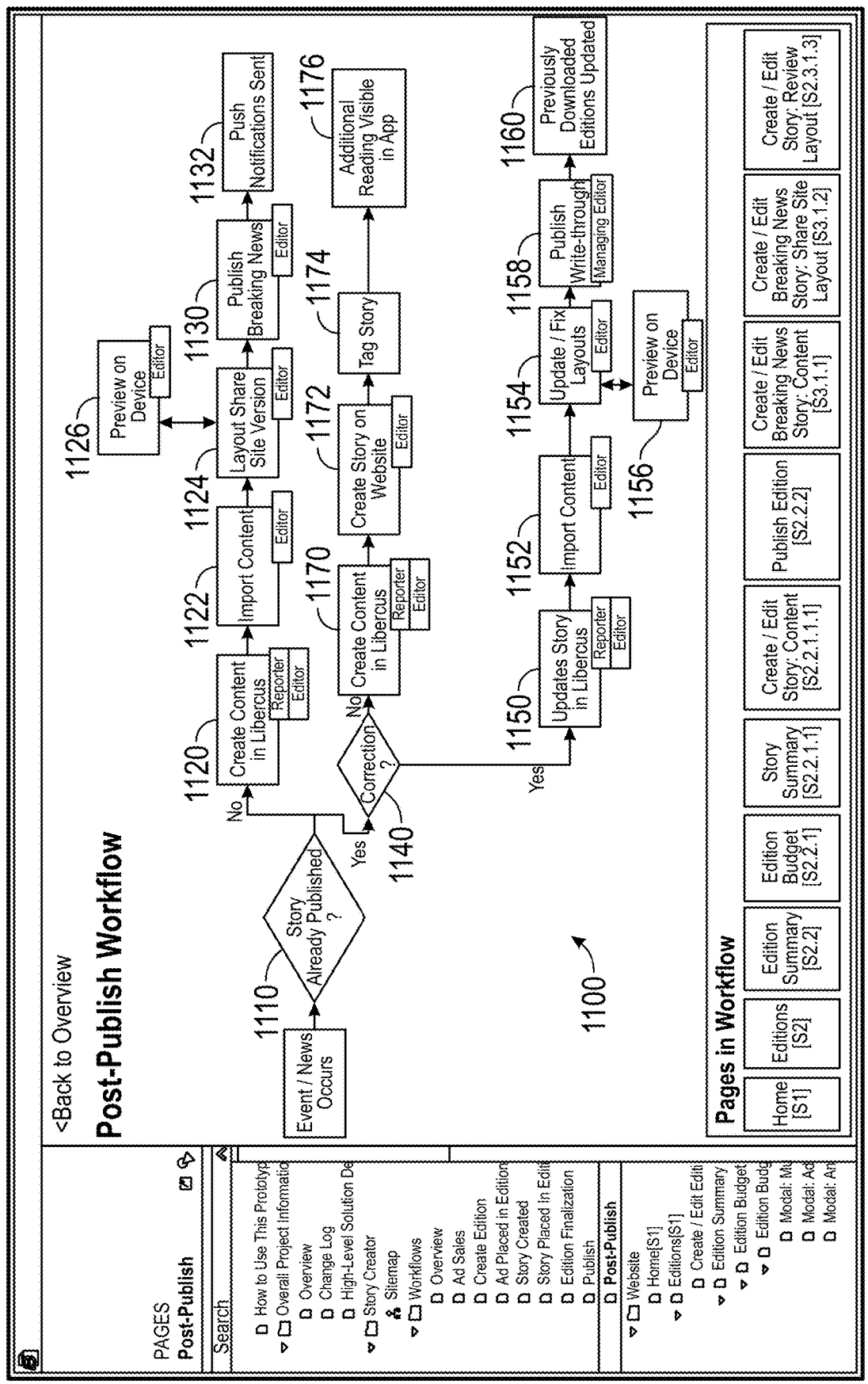
FIG. 11 is a workflow diagram showing the process in Story Creator for post-publishing tasks related to a NewsSlide edition.

FIG. 11 is a workflow diagram 1100 showing the process in Story Creator for post-publishing tasks related to a NewsSlide edition. The post-publish workflow relates specifically to situations where something newsworthy happens in between edition publishing cycles. For example, if a big story breaks just after a daily edition is published, then the workflow of FIG. 11 can be used to get that story out to users of the NewsSlide apps. When post-publish news happens, at decision diamond 1110 it is determined whether a story on the news event has already been published. If not, then at blocks 1120-1126, the story is created in Content Management System, imported into Story Creator and formatted/previewed for the share site. The breaking news story is published at block 1130, and push notifications are sent at block 1132, allowing NewsSlide users and other subscribers to NewsSlide push notifications to jump to the story on the NewsSlide share site 366.

If the breaking news story has been previously published, then at decision diamond 1140 it is determined whether or not to publish a story correction. Publication of corrections is intended to be used only sparingly in NewsSlide. If it is determined that a correction is warranted, then at blocks 1150-1156, an update to the story is created and laid out. At block 1158, a write-through of the story is published. At block 1160, previously downloaded editions are updated with the new version of the story on user devices running the apps 310-320.

If a correction is not to be published, then at block 1170 a story update is created in Content Management System by a reporter, and at block 1172 the story update is published on the newspaper website. At block 1174, the related story in the NewsSlide edition is tagged for additional reading. At block 1176, a NewsSlide app user, when viewing the story contained in the NewsSlide edition, can tap on the link for additional reading, and read the story update on the newspaper website.

The workflow diagrams of FIGS. 5-11 provide a framework for the types of activities involved in publishing a NewsSlide edition in the Story Creator system. Now attention will be turned to user interface pages of the Story Creator system which are used by newspaper employees (reporters, editors, etc.) for the various tasks and activities discussed above.

Figure 12:
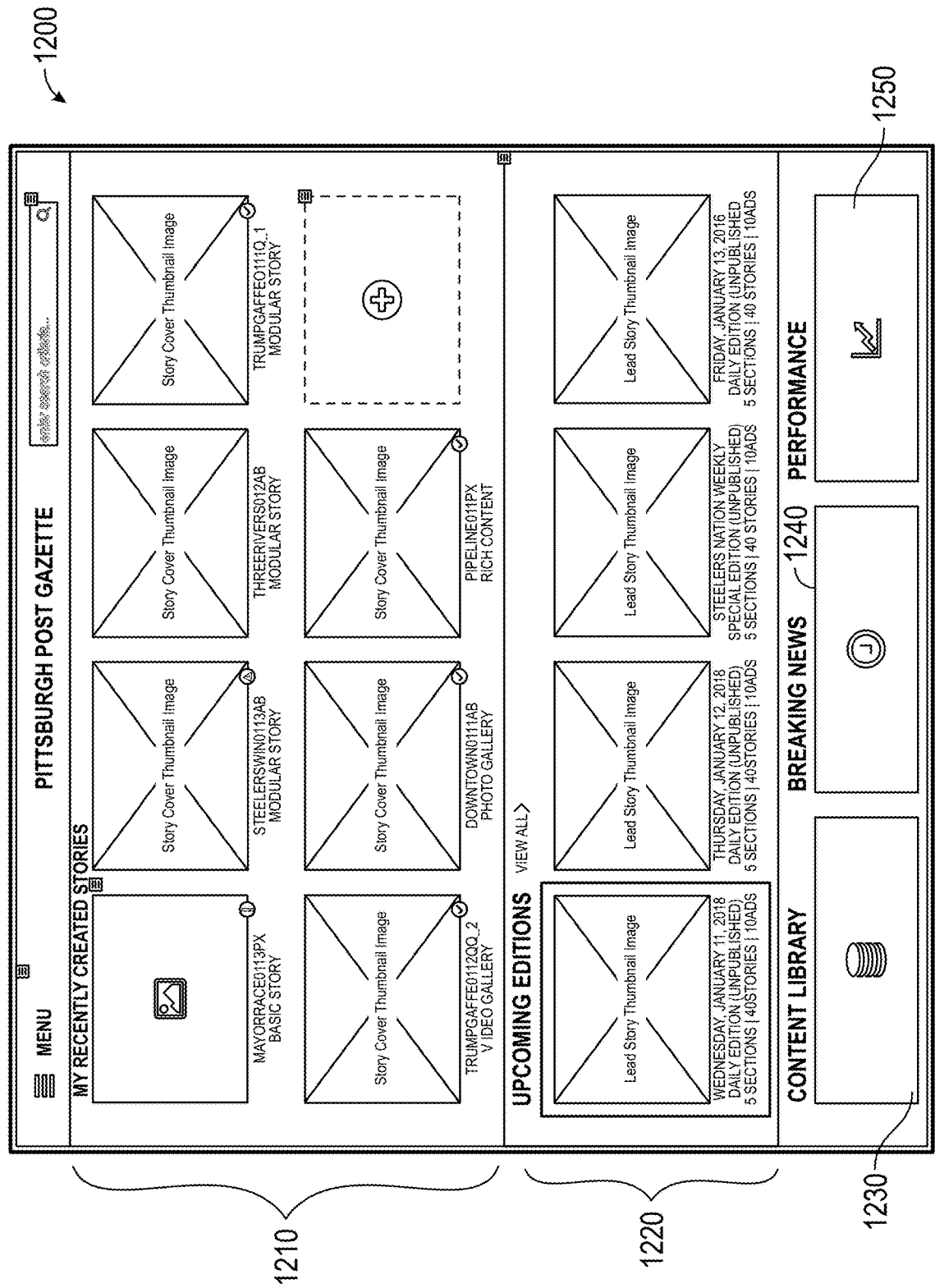
FIG. 12 is an illustration of a Story Creator home web page where writers and editors can access other web pages used for creating stories and publishing editions of NewsSlide.

FIG. 12 is an illustration 1200 of a Story Creator home web page where writers and editors can access other Story Creator pages used for creating stories and publishing editions of NewsSlide. This home page was shown previously as the element 410 of FIG. 4. The home page of FIG. 12 includes a story section 1210 containing recently created stories, where each story is depicted by its cover image and a headline (collectively known as a thumbnail). Other info is also shown for each story, including the type of story—such as a basic story, a modular story, a photo or video gallery, etc. The home page also includes an upcoming editions section 1220, where editions are depicted by their lead story thumbnail image and headline, with numbers of sections and stories also displayed. The sections 1210 and 1220 allow reporters and editors to quickly access stories and editions for preparation and finalization, as discussed above and again further below.

The home page also includes a content library link 1230, which leads to the Content Management System discussed previously—for accessing content and importing it into Story Creator. The home page further includes a breaking news link 1240, which leads to breaking news stories which have been or are being prepared. Finally, the home page includes a performance page link 1250, which leads to the Story Creator performance summary page 460 shown on FIG. 4 and discussed previously.

Figure 13:
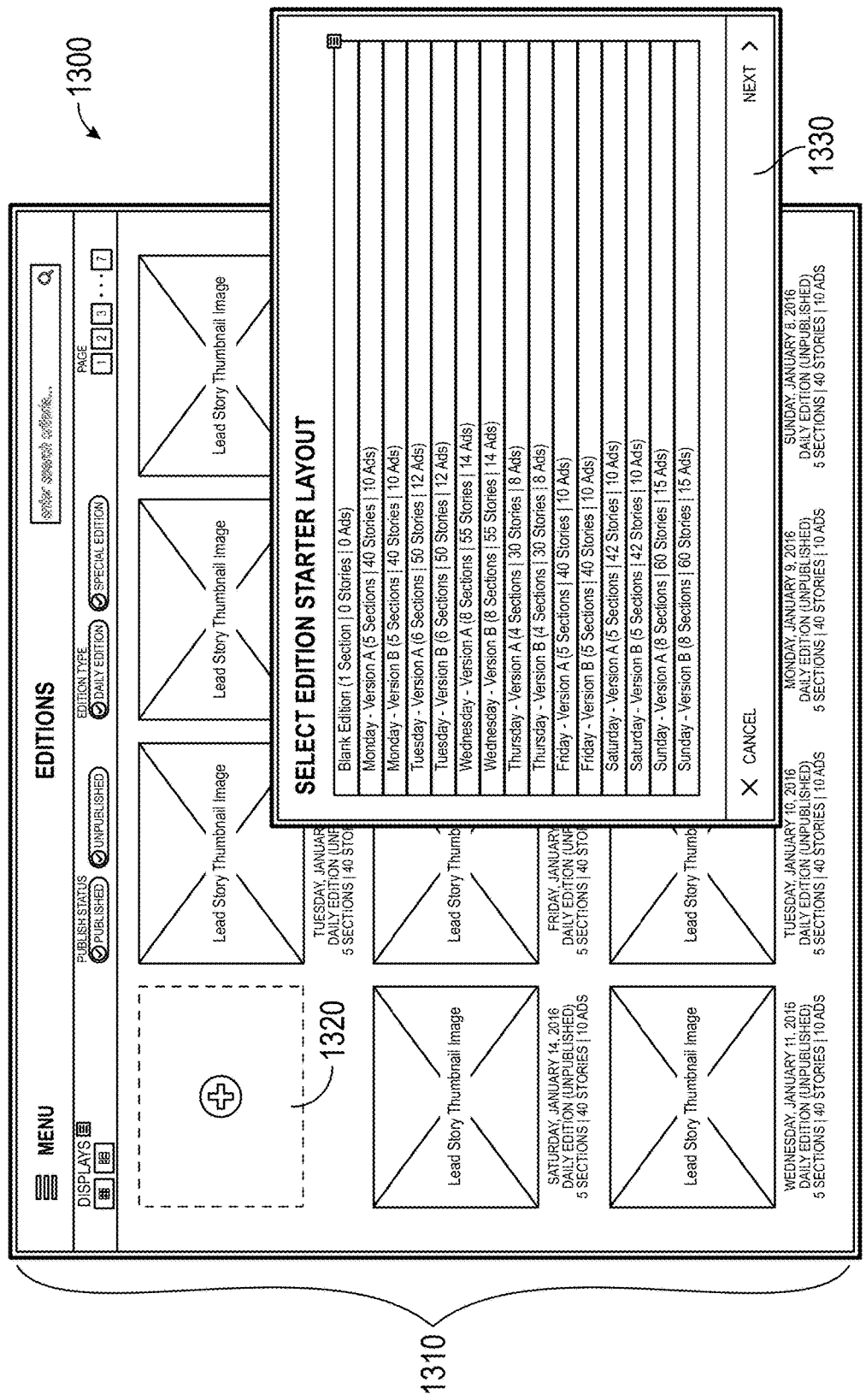
FIG. 13 is an illustration of a web page in Story Creator for creating and editing a NewsSlide edition, including an overlay for selecting a starter layout for a new edition.

FIG. 13 is an illustration 1300 of a web page in Story Creator for creating and editing a NewsSlide edition, including an overlay for selecting a starter layout for a new edition.

The editions page was shown as the element 420 on FIG. 4, and can be reached by clicking on "View All>" in the editions section 1220 of FIG. 12. As shown on FIG. 12, each edition on the editions page is depicted by its lead story thumbnail image and headline in section 1310, with numbers of sections and stories in each edition also displayed, along with published/unpublished status. From this page, an editor can select an edition to work on, finalize, and/or publish—as described in relation to FIGS. 8-10 above.

The editions page of FIG. 13 also enables creation of a new edition by clicking on a "+" box 1320. When the box 1320 is clicked, a pop-up dialog window 1330 appears, displaying all of the available edition starter layout templates. In addition to a blank edition which is built up by adding sections, stories and ads, two different edition layout templates are available for each day of the week. Although the A and B versions for each particular day of the week are shown having the same properties (numbers of sections, stories and ads), the A and B versions are still different by virtue of having different story layouts, different sections, different types of ads, etc. Once a new edition is created by selecting a template from the window 1330, the editor proceeds to add stories and ads to the edition as discussed previously, until the edition is ready for finalization and publication.

Figure 14:
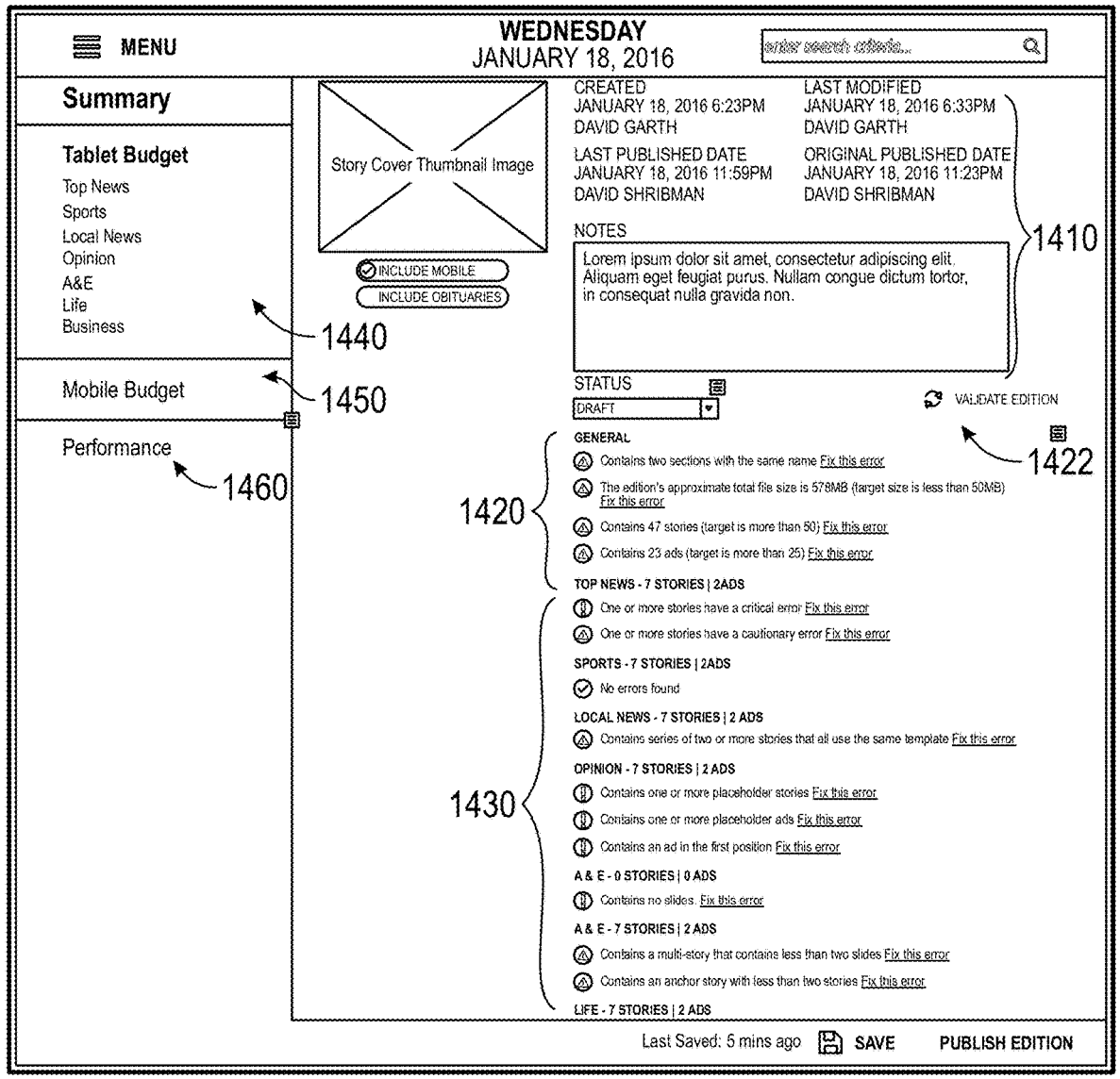
FIG. 14 is an illustration of a web page in Story Creator for viewing a summary of a NewsSlide edition.

FIG. 14 is an illustration 1400 of a web page in Story Creator for viewing a summary of a NewsSlide edition. The edition summary page of FIG. 14 corresponds to the element 424 of FIG. 4. The edition summary page includes a properties section 1410 at the top, including the story cover thumbnail image and headline, date/time of creation, revision and publication, notes, status, etc. The properties section 1410 also includes buttons for selecting or deselecting the mobile (phone) version of the edition, and inclusion of obituaries.

The edition summary page includes validation checks for the edition, including a general section 1420 listing any issues or notes about the edition in general, and a detailed section 1430 listing issues related to each section (Sports, Local News, etc.) of the edition. A button 1422 is used to trigger Story Creator to run the validation/error checks for the edition. The sections 1420 and 1430 may include cautionary errors (warnings—depicted in orange with a caution triangle) and/or critical errors (depicted in red with an exclamation point). Each error includes a link to "Fix this error", which directs the Story Creator user to the particular story, ad or section.

The general validation section 1420 includes checks such as file size of the edition, section names included, and number of stories and ads compared to the edition budget. The detailed validation section 1430 includes checks such as numbers and types of stories in each section, errors in the stories themselves, the existence of placeholder stories and/or ads, existence of an ad in the first position of a section, etc. Any type of warning or error that editors may want to be informed of can be included in the validation checks of the sections 1420 and 1430.

The edition summary page also includes—on the left side of the page—expandable sections for viewing the budget for the tablet version of the edition (1440), the budget for the mobile version of the edition if applicable (1450), and the performance of the edition (1460).

Figure 15:
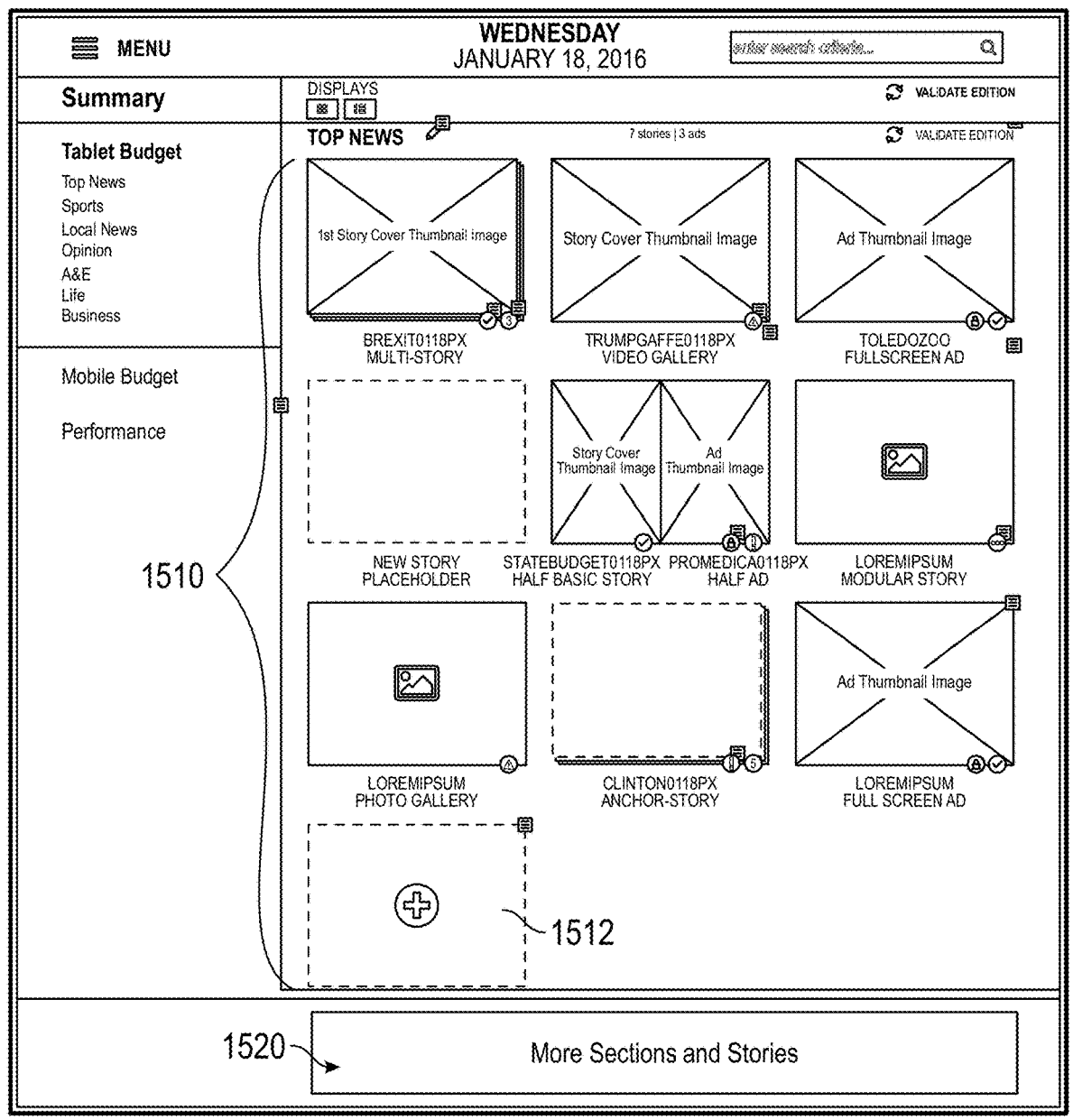
FIG. 15 is an illustration of a web page in Story Creator which depicts an edition budget for an in-progress NewsSlide edition, where the budget is a framework of stories and ads of different types.

FIG. 15 is an illustration 1500 of a web page in Story Creator which depicts an edition budget for an in-progress NewsSlide edition, where the budget is a framework of stories and ads of different types. The edition budget page of FIG. 15 is reached by clicking on the item 1440 of FIG. 14.

The edition budget page displays the complete arrangement of each section included in the edition, including stories and ads in the order that they will appear to a NewsSlide app user, and showing the type and size of each story and ad. The first section in the edition, Top News, is shown in section 1510 of FIG. 15.

At the top of the section 1510 it is indicated that this section includes seven stories and three ads. The arrangement of stories and ads, including their types and sizes, are shown in grid form below. The display may be changed from grid to list if the user prefers. The three ads, for example, include full-page ads in the third and ninth position, and a half-page ad shared with a half-page story in the fifth position. The positions indicate the order in which the items will appear when a NewsSlide app user "swipes" or scrolls through the section, as will be discussed below. Also visible in the Top News section 1510 are stories and galleries of different types, including a placeholder which will need to be embodied with an actual story before the edition can be published. An add ("+") button 1512 enables the editor to add a story or ad to the edition, as discussed below.

As shown at 1520, the remaining sections in the edition can be viewed below the Top News section 1510 by scrolling down or, alternately, by clicking section names at left. The edition budget page of FIG. 15 is used extensively by an editor to prepare an edition—including adding, arranging and re-arranging stories and ads in each section.

Figure 16:
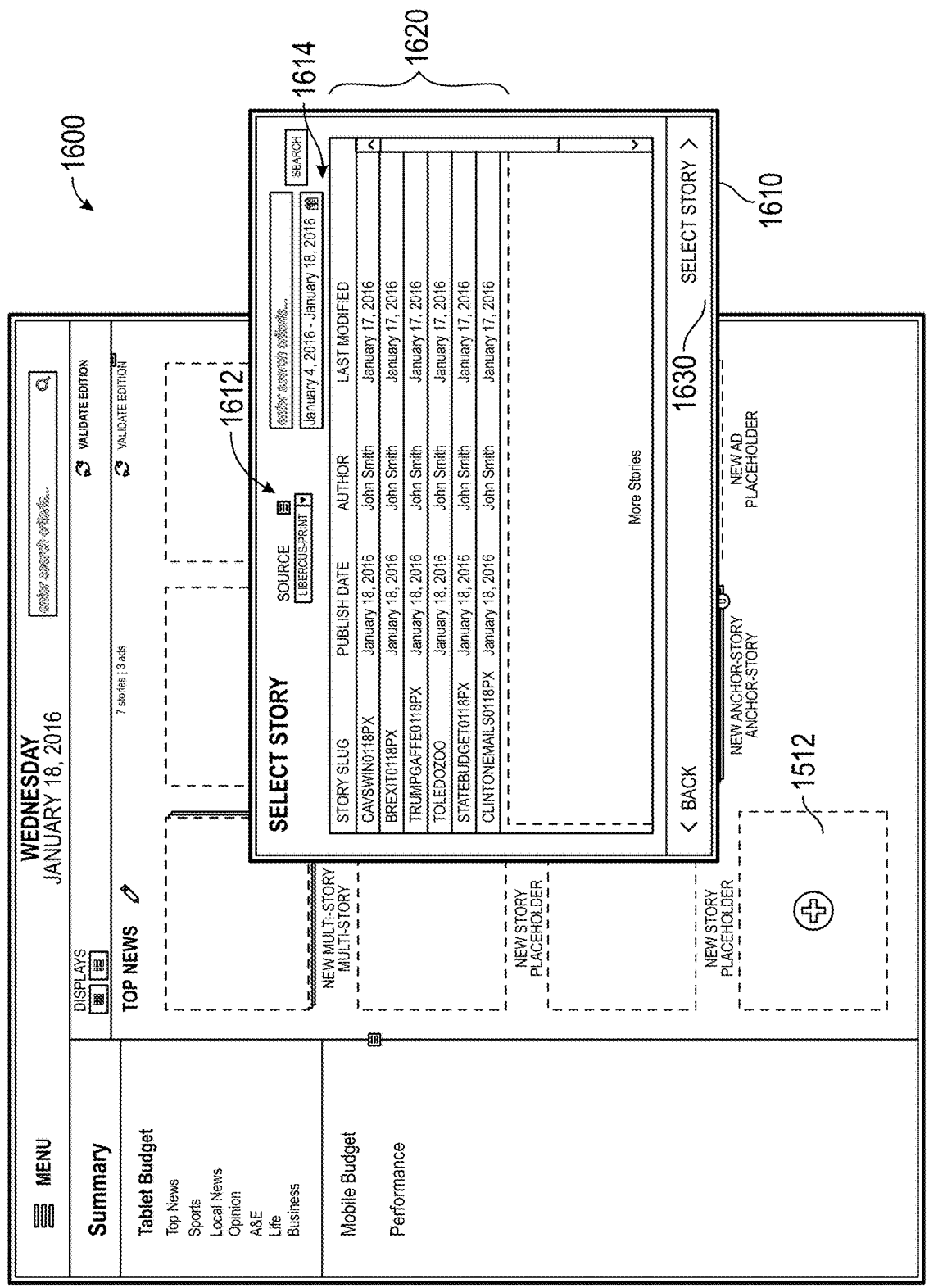
FIG. 16 is an illustration of the edition budget web page in Story Creator as shown in FIG. 15, including an overlay for selecting a story to add to the edition.

FIG. 16 is an illustration of the edition budget web page in Story Creator as shown in FIG. 15, including an overlay for selecting a story to add to the edition. When the add button 1512 is clicked, a pop-up dialog 1610 appears, allowing the editor to select the story to be included. At 1612, a source library for the story is selected from a drop list. Libercus (the Content Management System) is the source of stories written by the newspaper's own reporters, and is a commonly selected source. Other sources may include the Associated Press, United Press International, or other external content sources. At 1614, a date range is defined. A list 1620 of stories is displayed based on the selected source and the date range, where the editor can select one of the stories from the list 1620 and add it to the edition using a Select Story button 1630.

Figure 17:
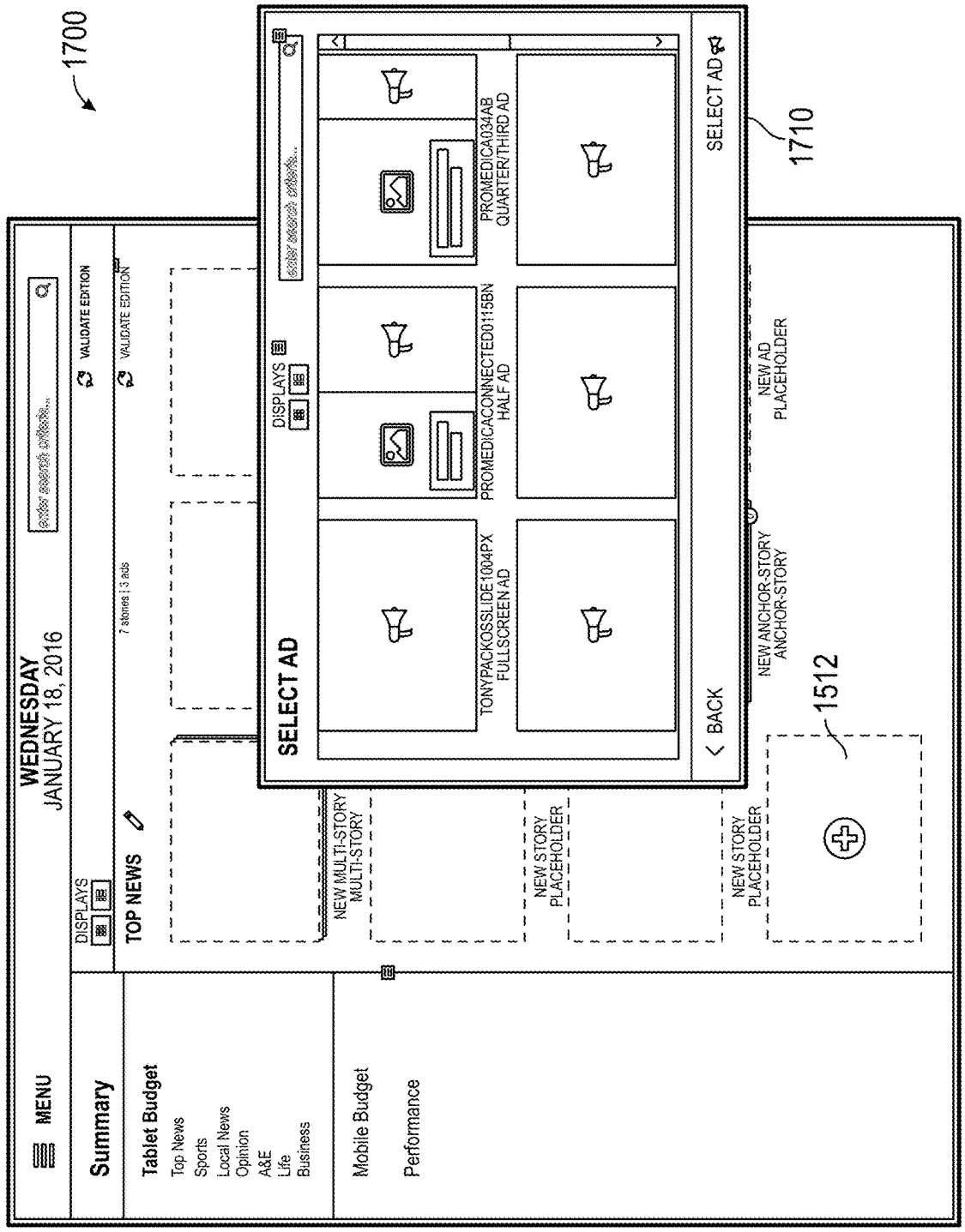
FIG. 17 is an illustration of the edition budget web page in Story Creator as shown in FIG. 15, including an overlay for selecting an advertisement to add to the edition.

FIG. 17 is an illustration 1700 of the edition budget web page in Story Creator as shown in FIG. 15, including an overlay for selecting an advertisement to add to the edition. When the add button 1512 is clicked, a pop-up dialog 1710 appears, allowing the editor to select an ad to be included in the edition. After the add button 1512 is clicked, a prompt may appear asking the editor whether a story or ad is to be added, resulting in the display of the pop-up dialog 1610 or 1710, respectively. The pop-up dialog 1710 includes a list or grid of ads which are prepared and available in the Content Management System. As can be seen in FIG. 17, the ads may be full-page ads, half-page or even smaller, where the ads less than a full page are shared with fractional-page stories; this pairing of fractional-page ads and stories occurs during edition layout. Ads may include a wide range of content—from simple static images, to static images with embedded Internet hyperlinks, to highly interactive features which respond to user activity. All of these types of ads are sold by ad sales representatives, prepared by creative designers, and selected for inclusion in editions by editors.

Adding stories as shown in FIG. 16 and adding ads as shown in FIG. 17 are performed by the editor for the Top News section (shown in FIGS. 15-17) and also for all other sections in an edition.

FIG. 18 is an illustration 1800 of a web page in Story Creator for viewing a summary of a NewsSlide story. The story summary page of FIG. 18 corresponds to the element 428 of FIG. 4. The story summary page of FIG. 18 is reached by clicking on one of the stories on the edition budget page of FIG. 15. A section 1810 includes general properties of the story, including the edition and section in which the story is destined to appear. A section 1820 includes validation checks for the story, in a manner similar to that shown for editions in FIG. 14. The section 1820 may include cautionary errors (warnings—depicted in orange with a caution triangle) and/or critical errors (depicted in red with an exclamation point). Each error includes a link to "Fix this error", which directs the Story Creator user to the particular portion of the story denoted by the error. It can be seen from the errors listed in the section 1820 that the story depicted in FIG. 18 is merely a placeholder, as it includes no story text, no images, etc.

FIG. 19 is an illustration 1900 of a web page in Story Creator for creating and editing content—specifically copy—in a NewsSlide story. The create/edit content page of FIG. 19 is the first element in the box 430 of FIG. 4. A top bar 1910 includes tabs for all of the different types of content which may be included in a story. These include copy (words), which is the specific focus of FIG. 19, along with images, videos, audio, documents, web links and rich content. A button 1912 takes the user to layout pages for the story, which are discussed relative to later figures below.

The copy tab of the create/edit content page of FIG. 19 includes a left column 1920 containing original copy and a right column 1930 containing current copy. The original copy column 1920 displays properties of the copy as it exists at its original source—such as the Content Management System. These properties include the slug (short name), various types of headlines, a byline, and the actual body of the story. The current copy column 1930 displays properties of the copy as it current exists in Story Creator—including fields corresponding to each field in the original column 1920.

It can be seen that the byline from the column 1920 is split into a byline and author fields in the current column 1930. Furthermore, some fields may be completed (when blank in the original) or changed in the current column 1930. Also, the body (text) in the current column 1930 is rich text (supporting formatting), whereas the body (text) in the original column 1920 is plain text. The copy tab of the create/edit content page of FIG. 19 provides reporters and editors with the tools needed to quickly and efficiently import a story from Content Management System or another source and format it for Story Creator.

FIG. 20 is an illustration 2000 of a web page in Story Creator for creating and editing content—specifically images—in a NewsSlide story. The top bar 1910 is shown in FIG. 20 highlighting the images tab, where it can be seen that three images currently exist for this story. Similarly to the copy tab of FIG. 19, the images tab includes an original column 2010 and a current column 2020. The image itself is not changed from the original, so only one image is displayed for each item on the images tab. However, the slug, credit and caption may all be changed from the original version in the column 2010 to a modified version in the current column 2020. A save button 2030 is shown on FIG. 20, and exists on all tabs of the create/edit content page of Story Creator.

Story Creator includes similar functionality for editing the other parts of a story indicated in the top bar 1910—including videos, audio, etc. Altogether, these tabs/pages provide all of the functionality needed for a reporter or editor to create and edit all of the components of a story.

Figure 21:
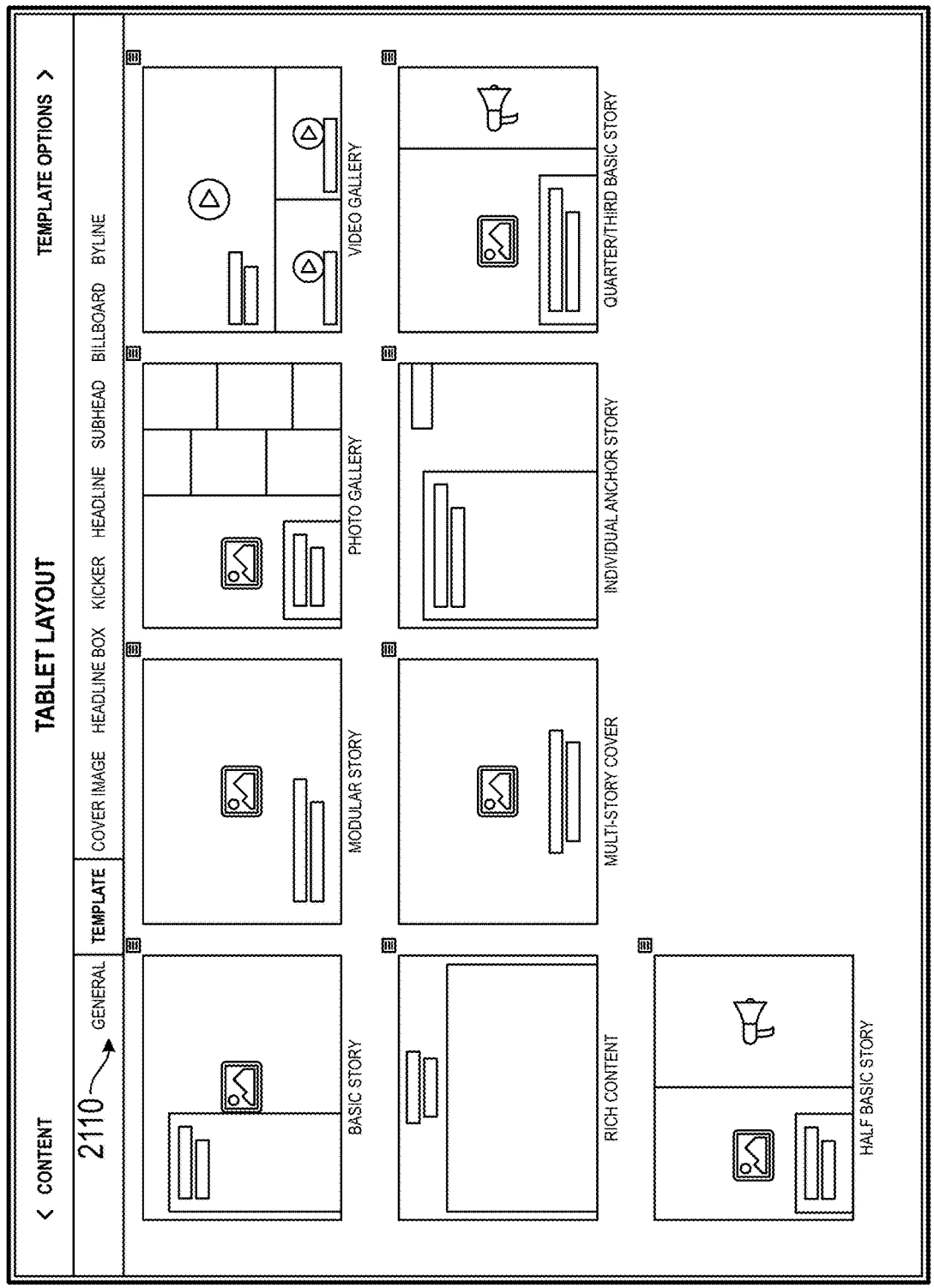
FIG. 21 is an illustration of a web page in Story Creator for defining a template format for a NewsSlide story in tablet layout.

FIG. 21 is an illustration 2100 of a web page in Story Creator for defining a template format for a NewsSlide story in tablet layout. A top bar 2110 includes tabs for all of the different elements of story layout which apply to a story. These include the template, which is the specific focus of FIG. 21, along with images, headlines of several types, etc. It is apparent in FIG. 21 that many different types of story templates are available in Story Creator. These include a basic story, a modular story, photo and video galleries, fractional-page stories, etc. Each of these different story templates is predefined in Story Creator to have a unique appearance and behavior in the tablet app 310. For example, the story text may be translucently scrolled over the top of the main story image, or the text may opaquely overtake the image upon scrolling, or the text may be confined to a column while the majority of the image remains unobstructed. Multi-story threads, anchor stories and fractional-page stories similarly have their own unique appearances and behaviors. The ability to provide these many unique story appearances and behaviors in NewsSlide, along with the pre-programming of them into templates in Story Creator, are distinguishing features of the NewsSlide architecture.

The web page 2100, shown on FIG. 21 and described above, illustrates several different types of templates which may be used for a story in the tablet layout. These templates can be configured using a series of template options web pages. These template options pages, not shown in the figures, include features for defining content containers, image galleries, "more reading" links, a thumbnail image and thumbnail metadata, etc.

Figure 22:
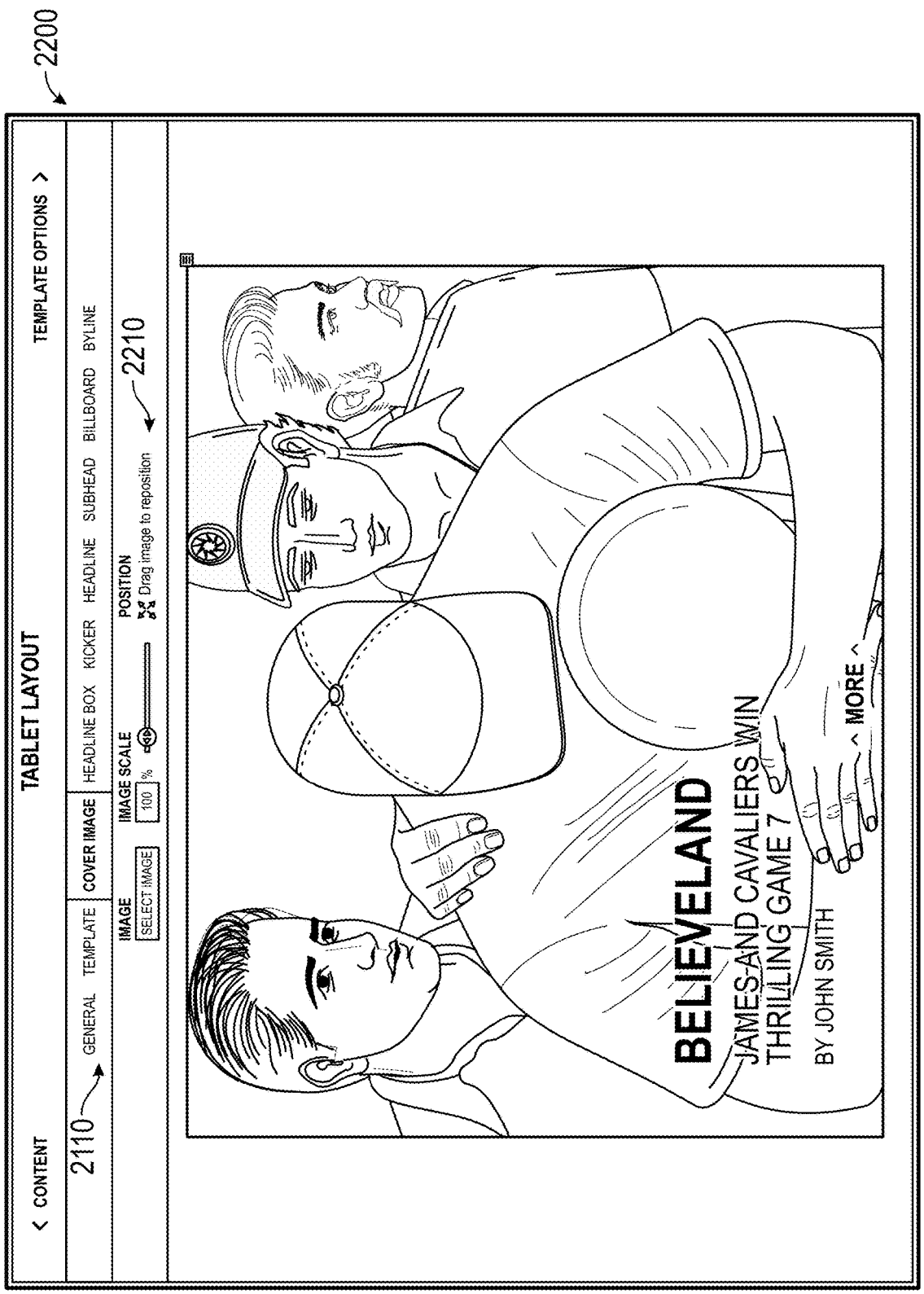
FIG. 22 is an illustration of a web page in Story Creator for defining a cover image for a NewsSlide story in tablet layout.

FIG. 22 is an illustration 2200 of a web page in Story Creator for defining a cover image for a NewsSlide story in tablet layout. The top bar 2110 (from FIG. 21) is shown in FIG. 22 highlighting the cover image tab, where it can be seen that an image has already been selected for this story. A tool bar 2210 provides tools for manipulating the chosen image to appear exactly as desired on the tablet app 310. These tools include scaling (zoom) and positioning (pan).

Figure 23:
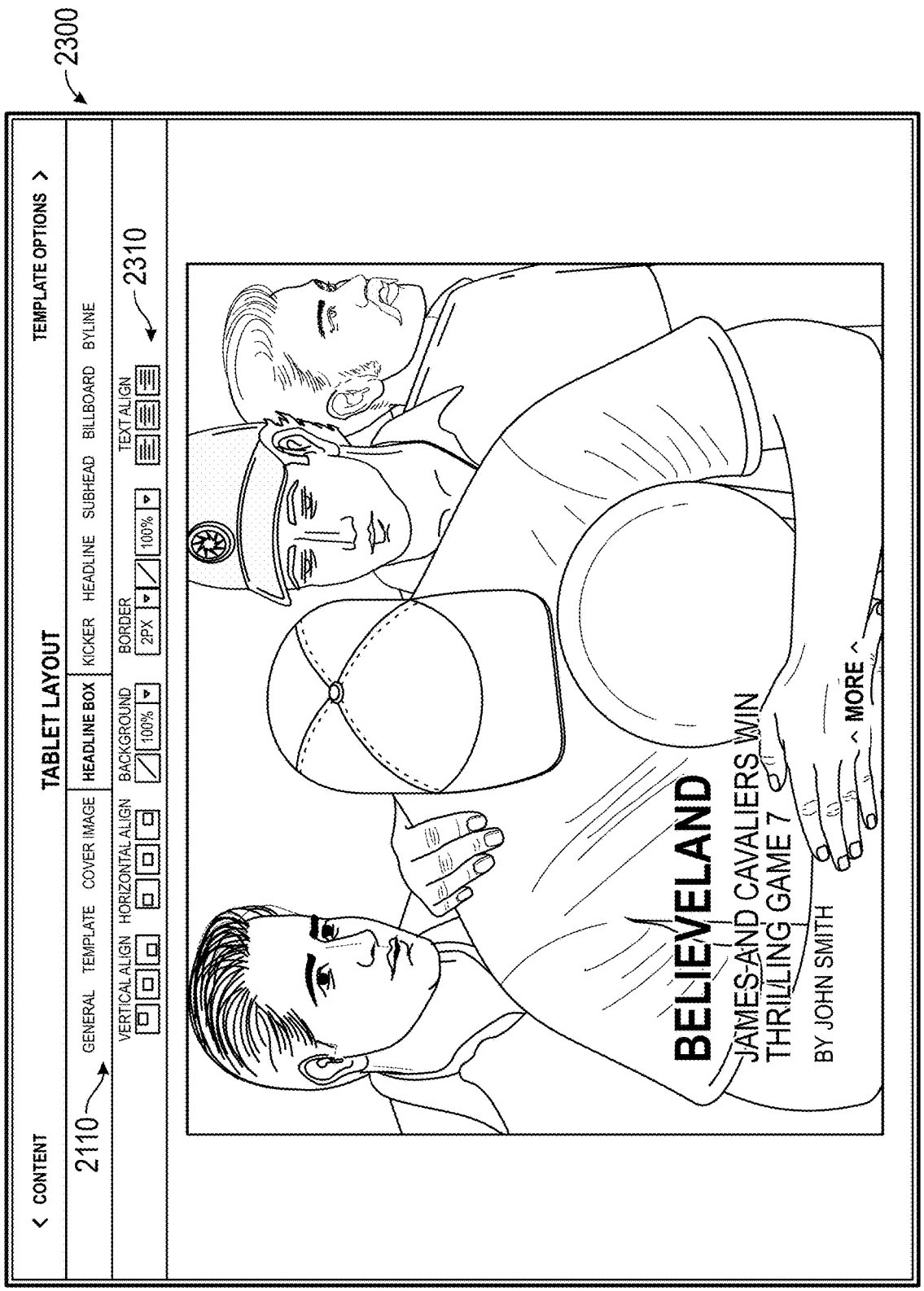
FIG. 23 is an illustration of a web page in Story Creator for defining a headline box for a NewsSlide story in tablet layout.

FIG. 23 is an illustration 2300 of a web page in Story Creator for defining a headline box for a NewsSlide story in tablet layout. The top bar 2110 is shown in FIG. 23 highlighting the headline box tab, where it can be seen that headline framing has already been defined for this story. A tool bar 2310 provides tools for manipulating the headline box to appear exactly as desired on the tablet app 310. These tools include horizontal and vertical alignment of the headline box, color, size and opacity of the headline background and border, and justification of the headline text itself (left/center/right).

In the create/edit story function, for the tablet layout, there are several more tabs or pages available—similar to the pages of FIGS. 21-23—for completing the layout of a story for the tablet app 310. These other pages, not shown in the figures, include features for defining a "kicker" (a form of text heading typically located above a headline), the headline itself, a subhead line if desired, a byline (author's name), etc. Each tablet layout tab/page includes an appropriate toolbar for formatting the story element which is the focus of the page. These additional feature pages, along with the pages 2100-2300, are all contained in the tablet layout portion of the box 430 on the site map 400 of FIG. 4.

Figure 24:
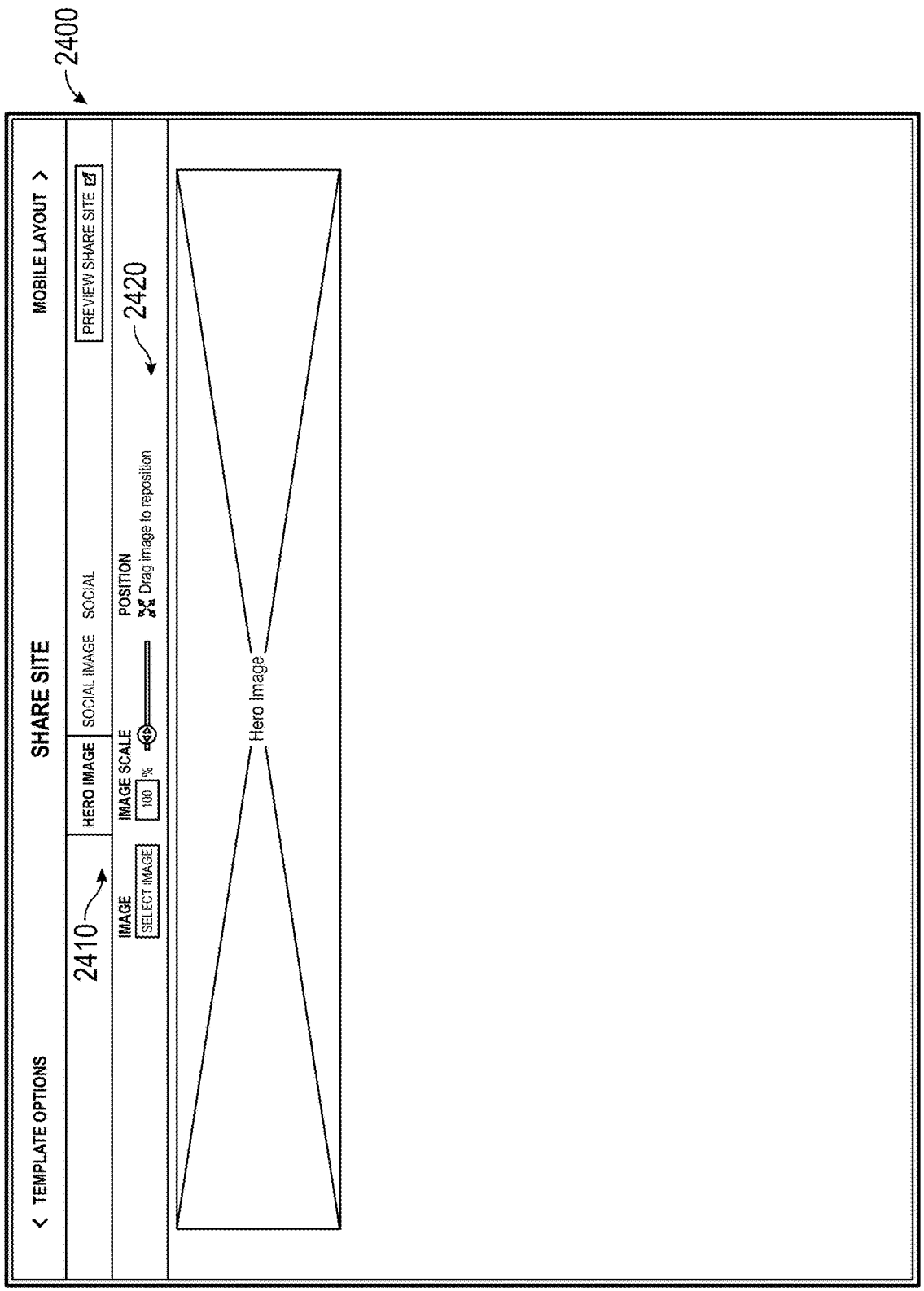
FIG. 24 is an illustration of a web page in Story Creator for defining a hero image for a NewsSlide story for publishing to a share site.

FIG. 24 is an illustration 2400 of a web page in Story Creator for defining a hero image for a NewsSlide story for publishing to a share site. Whereas the pages of FIGS. 21-23 were used for formatting a story for the tablet app 310, the page of FIG. 24 is used for formatting a story for the share site 366 of FIG. 3. Recall that the share site 366 is a gateway for publishing NewsSlide stories to the Internet, pushing them to social media, etc. Thus, the formatting requirements for a story are different for the share site than they are for the tablet app 310 or the mobile app 320.

More specifically, the formatting options for a story are limited for publishing to the share site. A top menu bar 2410 shows only three tabs for formatting for the share site. The hero image tab, shown on FIG. 24, provides formatting options for a "hero image" for the story, which is a large web banner image, prominently placed on a web page, generally in the front and center. A tool bar 2420 provides tools for manipulating the hero image to appear exactly as desired on the share site. These tools include image selection along with scaling (zoom) and positioning (pan).

The social image tab of the share site story formatting page is similar to the hero image tab shown in FIG. 24. The social image is formatted specifically for use on social media sites, and has much different size and resolution requirements than the hero image. Finally, the tab labelled "social" in the top menu bar 2410 includes formatting definition for the remainder of the properties of a share site story—such as a social share title, headlines, and a brief description. The text of the story itself remains unchanged for the share site as compared to the tablet version of the story.

Figure 25:
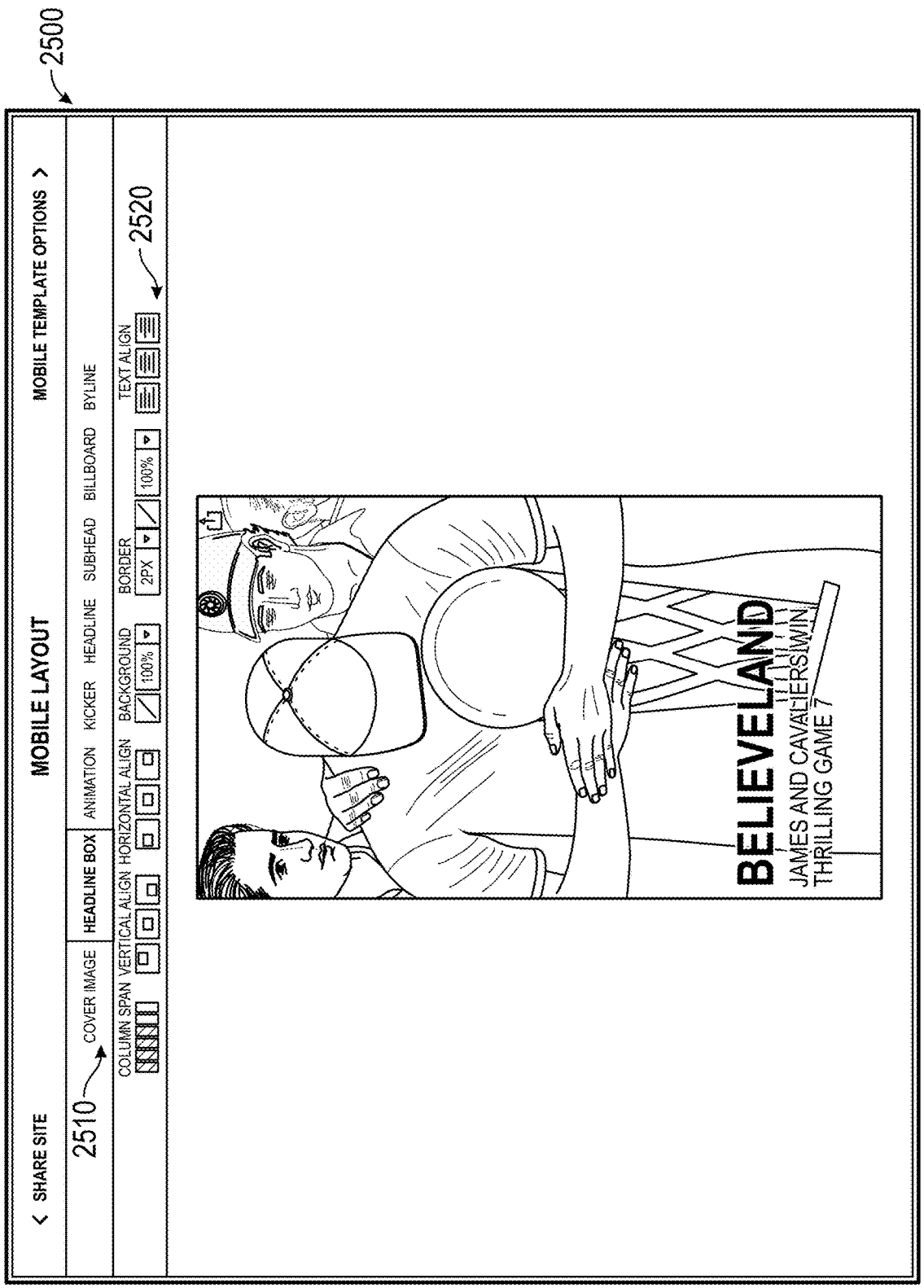
FIG. 25 is an illustration of a web page in Story Creator for defining a headline box for a NewsSlide story in mobile layout.

FIG. 25 is an illustration 2500 of a web page in Story Creator for defining a headline box for a NewsSlide story in mobile layout. Whereas the pages of FIGS. 21-23 were used for formatting a story for the tablet app 310, the page of FIG. 25 is used for formatting a story for the mobile (phone) app 320 of FIG. 3. The mobile app 320 is designed for the normal portrait orientation of a smart phone, as compared to the normal landscape orientation of a tablet. This difference in size and aspect ratio necessitates the formatting of each story separately for the mobile app vs. the tablet app.

A top bar 2510 includes tabs for all of the different elements of story layout which apply to a story to be published to the mobile app 320. These include the headline box, which is the specific focus of FIG. 25 and is similar to that shown in FIG. 23, along with the cover image, animation, headlines of several types, a byline, etc. These other tabs/pages are not included in the figures, as they are very similar to the equivalent pages shown and described previously for the tablet formatting of a story.

A tool bar 2520 provides tools for manipulating the headline box to appear exactly as desired on the mobile app 320. These tools include horizontal and vertical alignment of the headline box, color, size and opacity of the headline background and border, and justification of the headline text itself (left/center/right). A column span tool is also provided, where the fraction of the width of the screen to use for the headline box is defined.

It is apparent that the mobile app story being formatted in FIG. 25 is the same story shown in FIGS. 22-23, and that the same cover image has been selected for mobile as for tablet (although they could be different). However, the image for the mobile app has been sized and cropped differently than the same image for the tablet app. This illustrates both how the NewsSlide apps 310-320 are customized for the specific user device, and how the features of Story Creator facilitate preparation and publication of the customized NewsSlide editions.

Using the tools and features shown on the pages of FIGS. 19-25, reporters and editors can create stories and format them for the tablet app 310, the mobile app 320 and the share site 366.

Figure 26:
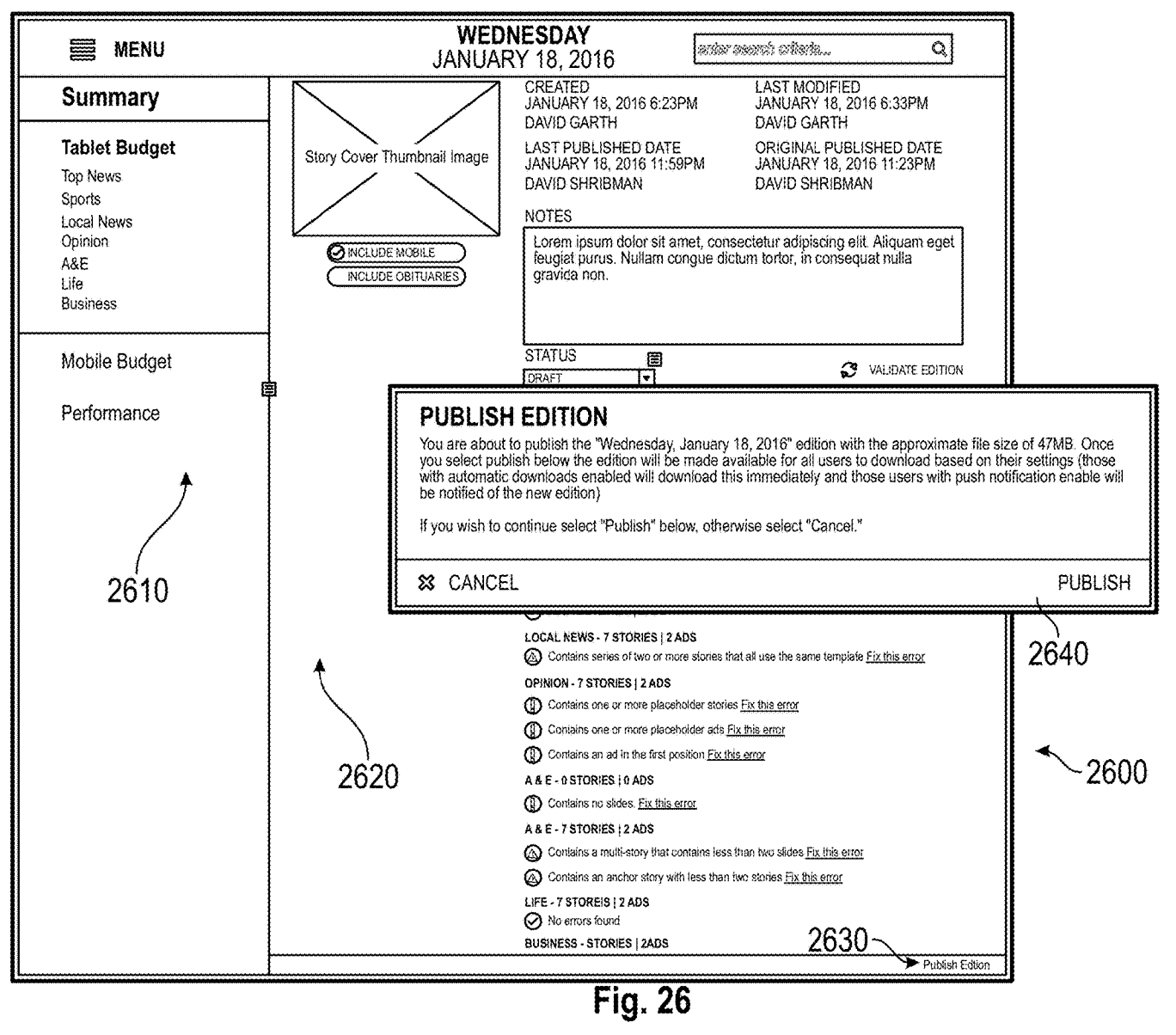

FIG. 26 is an illustration 2600 of a web page in Story Creator for publishing a NewsSlide edition, including an overlay for a final confirmation of the publish action. A left side bar 2610 allows an editor to view the tablet budget, the mobile budget and performance data, as seen previously on FIGS. 14-17. A main window 2620 contains a properties summary section and validation checks, similar to the edition summary page of FIG. 14. When all warnings and errors are corrected and the validation check yields all green results, the editor clicks on a Publish Edition button 2630 at the bottom of the page. This invokes a pop-up dialog 2640 as a final confirmation of the publish edition action about to be taken. When the Publish button is clicked in the confirmation window, the edition is published.

Figure 27:
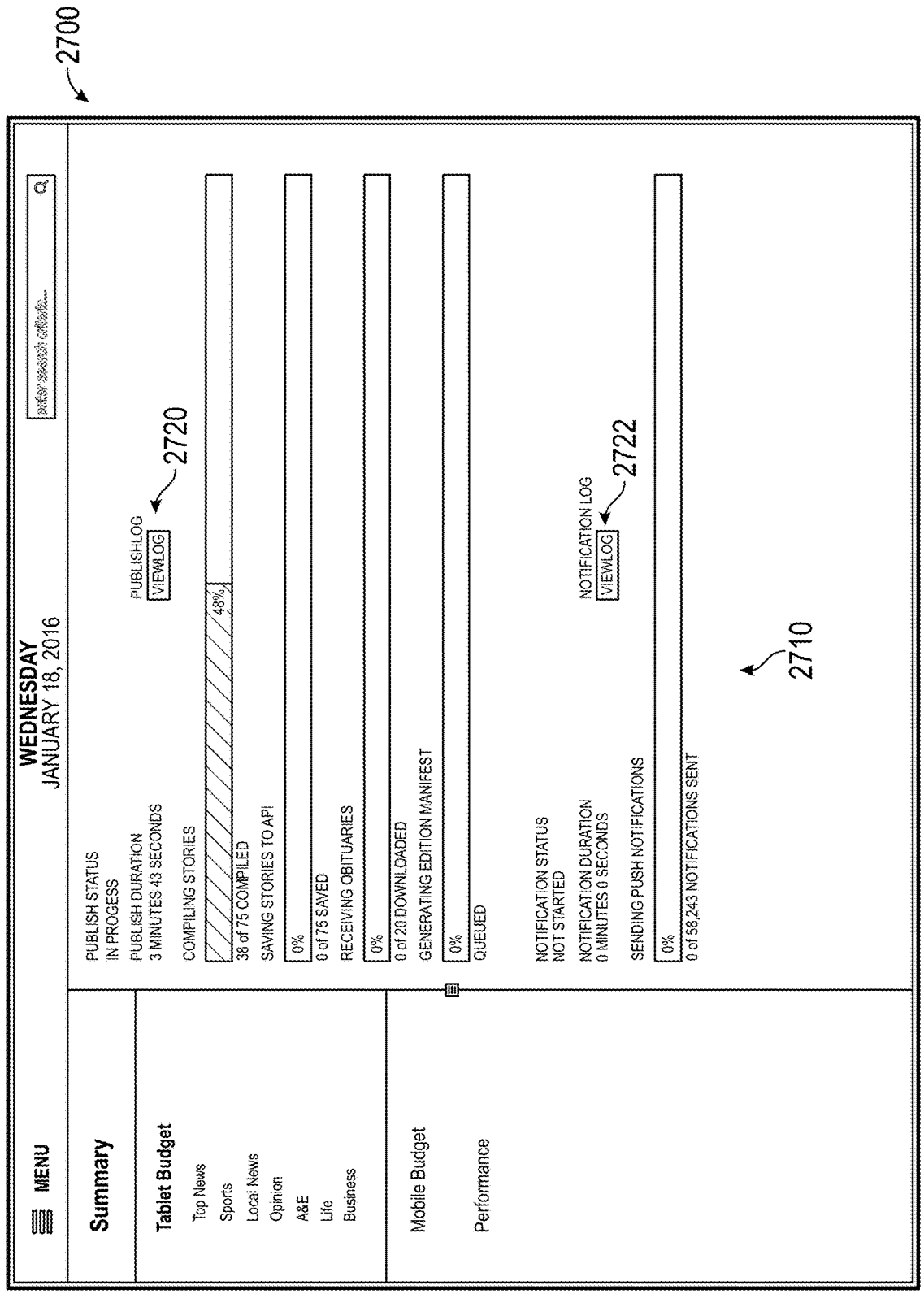
FIG. 27 is an illustration of a web page in Story Creator showing progress during publishing of a NewsSlide edition.

FIG. 27 is an illustration 2700 of a web page in Story Creator showing progress during publishing of a NewsSlide edition. The page shown in FIG. 27 immediately follows the Publish action of FIG. 26. The publish status page of FIG. 27 contains just a main section 2710 in which the progress of each sequential step is displayed—beginning with compiling stories and ending with sending push notifications. Buttons 2720 and 2722 are also provided for viewing the publish log and the notification log, respectively.

FIG. 28 is an illustration 2800 of a web page in Story Creator for viewing performance data for a published NewsSlide edition. The edition performance page of FIG. 28 represents the box 434 on the hierarchy diagram of FIG. 4. The edition performance page has a similar layout to other edition-related pages, with the familiar items on a left side bar 2810. The edition performance page of FIG. 28 is reached by clicking on the Performance link in the left side bar 2810.

A main window 2820 of the edition performance page includes a tabular listing of all of the stories and ads included in the particular edition. These items are listed in sequential order according to their position in the edition. It should be noted that position numbers can have decimal values, where a multi-story grouping includes a cover, a main modular story, a photo gallery, and potentially other content. For each item in the list, the slug (short name) is listed, along with the type of story or ad, the number of views by users of the apps 310-320, and the average duration of each view. For ads only, a click-through rate is displayed, which is the percentage of users who clicked on the ad to view or interact with it, as opposed to merely swiping to the next page to read another story.

Retrieval of the edition performance data by Story Creator is enabled by the architecture shown in FIG. 3, where the apps 310-320 include analytics features as would be understood by those skilled in the art of mobile apps, and the app analytics are fed back to the server hosting Story Creator. The story performance data is valuable to reporters and editors as it indicates what stories and sections of NewsSlide are most popular with readers. The ad performance data is valuable to the NewsSlide publisher and to advertisers, as it indicates the level of reader engagement with each individual ad, providing publishers with factual data to support pricing, and providing advertisers with an understanding of advertisement types and sectional placements which are most effective.

FIG. 29 is an illustration 2900 of a web page in Story Creator for selecting an entry in the Content Management System to use as a Breaking News story in NewsSlide. The Breaking News features and pages of Story Creator were shown previously in boxes the 440-446 of FIG. 4, including the box 444 at the bottom. As discussed earlier, because NewsSlide editions are normally published daily, the breaking news publication feature is desirable as it provides a way to publish significant news stories using Story Creator and the NewsSlide architecture, independent of the daily editions.

When an editor clicks on Breaking News (item 1240 of FIG. 12), a list of recent breaking news stories is displayed in a window 2910. The name and status (published or not) of each story is displayed in a table, along with other properties. If the editor wants to create a new breaking news story, he/she clicks on a Create button 2912. This invokes a Select Story dialog 2920, where a source is selected (such as Libercus, a.k.a. Content Management System), and a list of available stories is displayed. A story is selected from the list in the dialog 2920.

Figure 30:
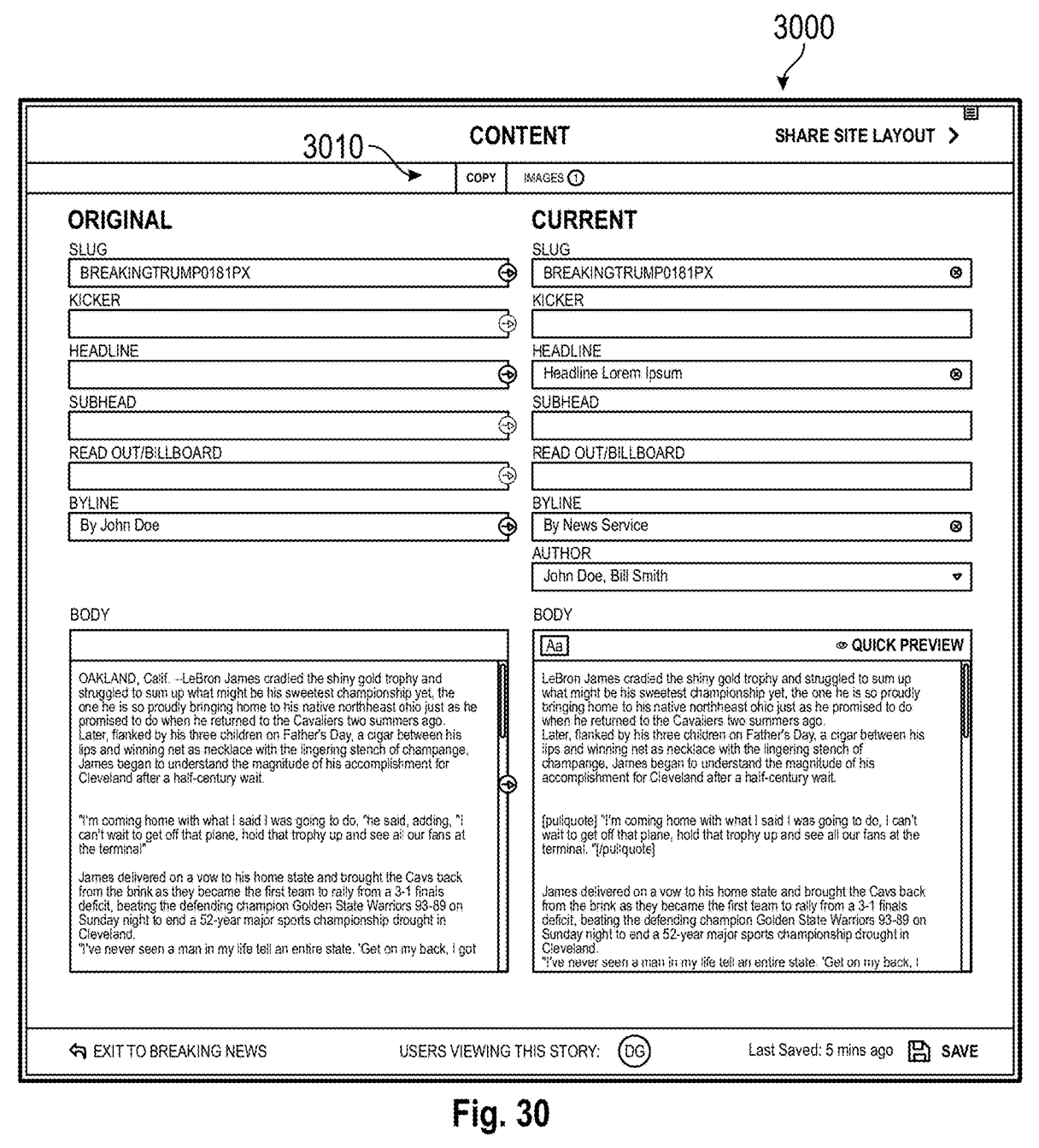
Figure 31:
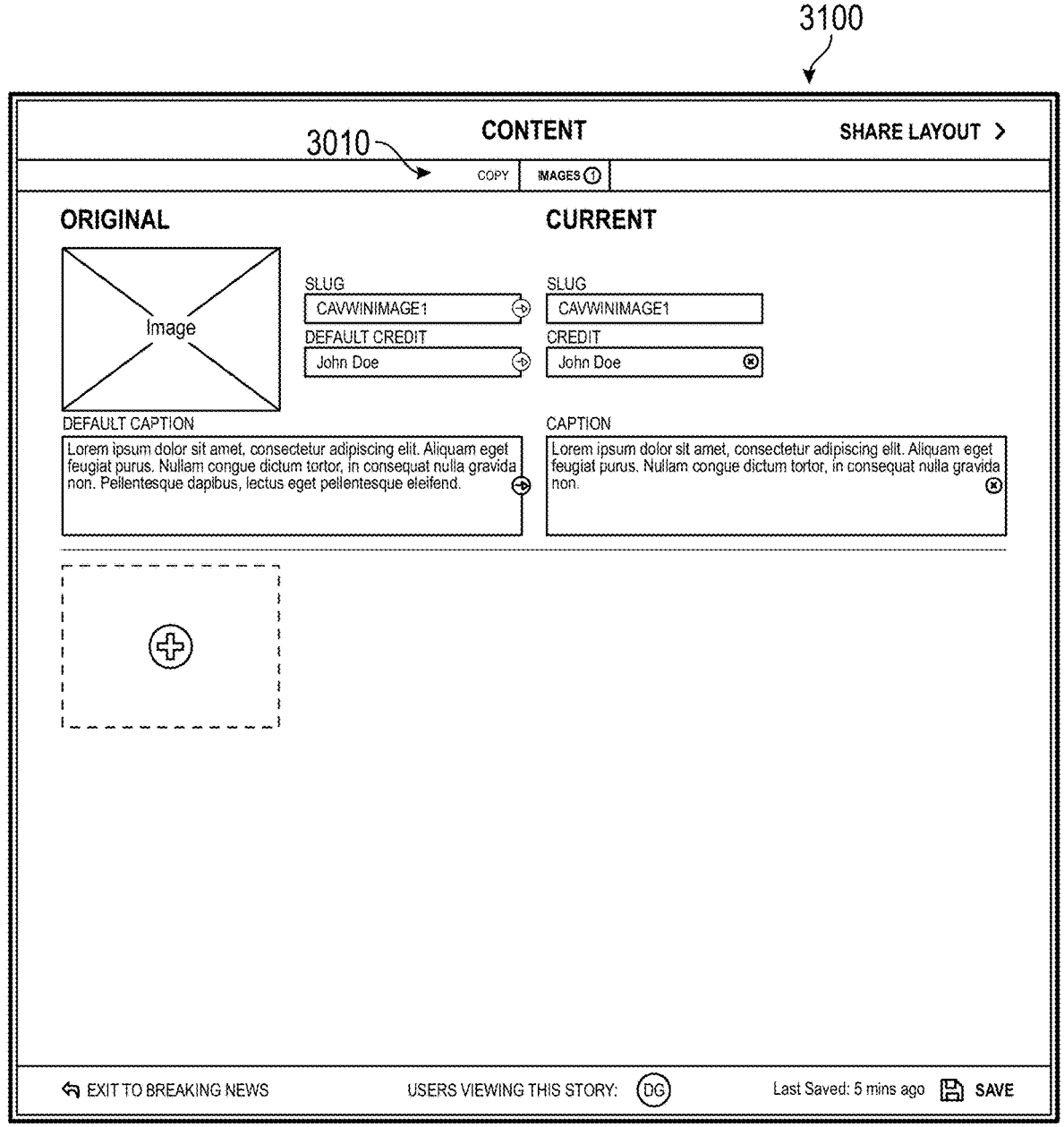
FIG. 31 is an illustration of a web page in Story Creator for creating and editing images in a Breaking News story in NewsSlide.

FIG. 30 is an illustration 3000 of a web page in Story Creator for creating and editing copy in a Breaking News story in NewsSlide, and FIG. 31 is an illustration 3100 of a web page in Story Creator for creating and editing images in a Breaking News story in NewsSlide. FIGS. 30 and 31 are very similar to the pages shown in FIGS. 19 and 20, where FIGS. 19 and 20 were directed to stories for a NewsSlide edition. In contrast, FIGS. 30-31 are directed to breaking news stories. It will be recalled that breaking news stories do not appear in the NewsSlide editions, but rather are published only to the share site, and are available via a separate button in the apps 310-320. Thus, because the breaking news story will not appear with other stories within the editions of the apps 310-320, there are fewer content options in a top bar 3010 of FIGS. 30-31. Otherwise, the breaking news copy and image pages of FIGS. 30-31 are similar to the NewsSlide story copy and image pages of FIGS. 19-20, with original copy and images shown on the left side of the page, and current/modified copy and images shown on the right side of the page.

Once the content (copy and images) for a breaking news story are selected, the story layout must be defined before the breaking news story can be published. Because breaking news is only published to the share site, only a share site layout must be defined. The share site layout feature for a breaking news story is essentially the same as the share site layout feature for a NewsSlide story, which was shown on FIG. 24 (hero image format, social image format, and social data definition).

Figure 32:
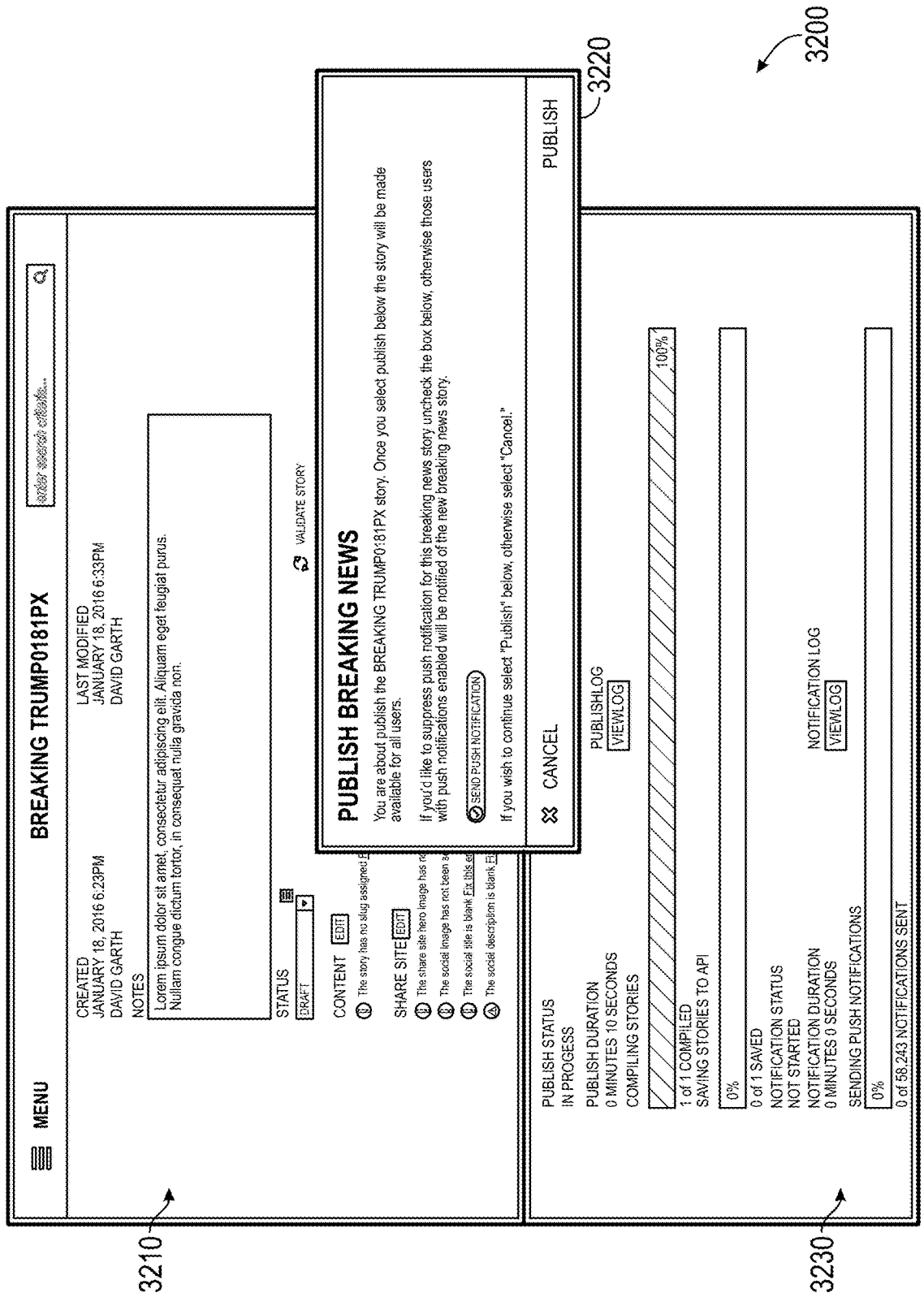
FIG. 32 is an illustration of web pages in Story Creator for publishing a Breaking News story in the NewsSlide architecture, including an overlay for a final confirmation of the publish action.

FIG. 32 is an illustration 3200 of web pages in Story Creator for publishing a Breaking News story in the NewsSlide architecture, including an overlay for a final confirmation of the publish action. At the top is a page 3210 which provides summary information for the breaking news story, and validation check data, in a manner described previously for stories and editions. When it is determined that the breaking news story has been properly prepared and validated, the editor clicks a Publish button (not visible—hidden by pop-up) and a pop-up dialog 3220 appears to confirm the decision to publish the breaking news story. As shown, the pop-up dialog includes the option to send or not send push notifications about the breaking news story.

When the Publish button on the pop-up dialog 3220 is clicked, Story Creator begins publishing the breaking news story, and a page 3230 is created in which progress statistics are displayed. Because the breaking news story is just a single story, and there are not tablet and mobile app versions, the publication of a breaking news story is less involved and less time consuming than the publication of an edition as discussed earlier.

The publication of a breaking news story includes publishing the story to the share site, updating the apps 310-320 to include the latest breaking news story in the breaking news page (separate from the daily editions), and optionally sending push notifications to messaging services for user notification in the apps.

Figure 33:
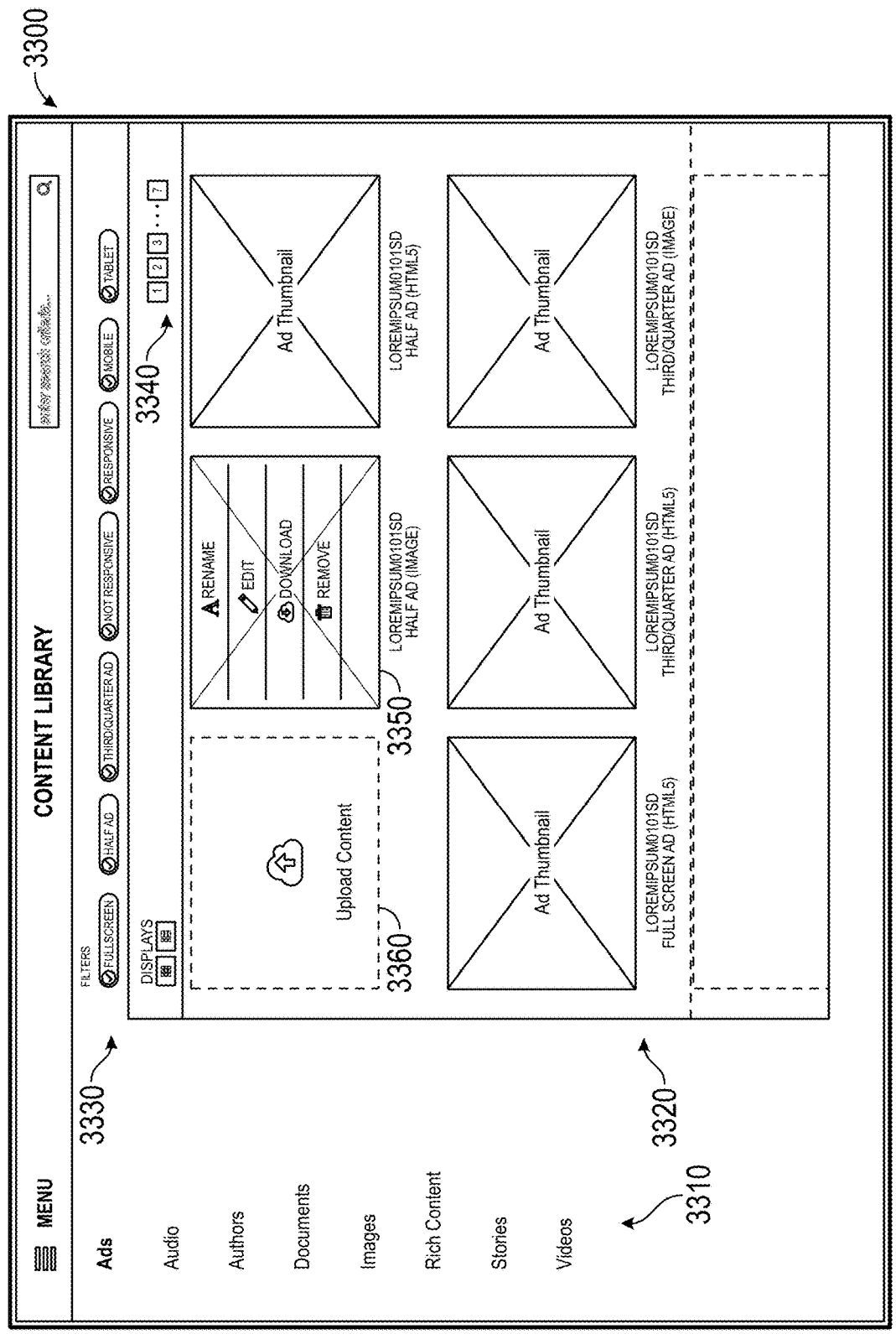
FIG. 33 is an illustration of a web page in Story Creator for viewing items in a Content Management System, specifically ads, to use in NewsSlide.

FIG. 33 is an illustration 3300 of a web page in Story Creator for viewing items in a Content Management System, specifically ads, to use in NewsSlide. The Content Management System 340 (FIG. 3) has been mentioned many times in preceding discussion as being the source of ads, stories, photos, videos and other content to be incorporated into NewsSlide stories and editions. In FIG. 4, the content library was shown as the box 450, which the page of FIG. 33 represents. In a left side bar 3310, all of the types of content in the Content Management System are listed. In the case of FIG. 33, Ads has been selected, so a main window 3320 displays thumbnails of available ads.

A filter bar 3330 allows filtering of ads by various types—such as full page, half page or fractional page, responsive (interactive) or not, and mobile vs. tablet. It is noteworthy that ads may be prepared for the mobile phone app, the tablet app, or both, as some ads may have a format or content that is more suitable for one delivery platform or the other. The filters in the filter bar 3330 are helpful in narrowing down the number of displayed ads, because without filtering there may be many pages of ads, as indicated at 3340.

The main window 3320 then displays a list or grid of the ads meeting the filter criteria. Each ad in the grid includes a thumbnail image and basic data such as size (full/half/fractional page) and type (image is a static image; HTML5 is rich or interactive content). When the user's mouse is hovered over an ad item, actions appear as indicated at ad 3350, where the actions include renaming, editing, deleting and downloading (using) the ad. An upload ad box 3360 is always available in the first spot of the grid for uploading a file (image, HTML5, etc.) to create a new ad.

Similar features are available for viewing other types of content in the Content Management System (stories, photos, etc.), where the filters and the thumbnails are configured as appropriate for each type of content.

FIG. 34 is an illustration 3400 of a web page in Story Creator for viewing performance data for an ad campaign for the published NewsSlide editions in which the ad appears. The performance summary page of Story Creator was shown previously in the box 460 of FIG. 4, and is available by clicking on the box 1250 of FIG. 12.

A main performance window 3410 lists ad campaigns which have been sold by the newspaper publisher and published in NewsSlide. When one of these ad campaigns is clicked on, a pop-up dialog 3420 appears, in which performance data is tabulated for each daily NewsSlide edition in which the ad appeared. The table includes, for each daily edition, an entry for each section (Sports, Business, etc.) in which the ad appeared, and the sequential position of the ad in the section. For each section entry, the slug/name, type of ad, number of views, average view duration and click-through rate are listed. The performance summary page of FIG. 34 provides powerful data for the newspaper publisher to show the advertiser, demonstrating the actual ad penetration with readers, and leading to more ad sales in the future. The performance summary information is also valuable to the advertiser, as it indicates which ad contents, format and sectional placement are most effective with readers.

The preceding discussion of FIGS. 12-34 has provided a detailed description of the Story Creator module of the NewsSlide architecture and its interaction with the apps 310-320 and the other elements of the NewsSlide publishing architecture. Attention will now be turned to the look and feel of the apps 310-320 themselves.

It should first be explained that the apps 310-320 are designed for mobile devices (phones and tablets) which have touch-screen displays. Thus, in the manner known in the art, each type of page which is displayed in the apps (home page, story page, etc.) can have a different format and include different combinations of icons and buttons. Further, the term "button" is understood to describe a "soft" button (in icon on a touch screen), not a physical or mechanical button on the mobile device.

Figure 35:
FIG. 35 is an illustration of a screen shot from a tablet device displaying a NewsSlide story, as would result from tapping on the headline story of the launch page displayed in FIG. 1.

FIG. 35 is an illustration 3500 of a screen shot from a tablet device displaying a NewsSlide story, as would result from tapping on the headline story 122-124 of the launch page displayed in FIG. 1. Recall that the tablet app launch page of FIG. 1 included the headline story, other top news stories in a grid below, and the section bars 110 to the right. In FIG. 35, once the headline story has been selected, that story alone is expanded to occupy virtually the entire display—including a cover image 3510 (which may be different than the image used on the launch page), and a copy column 3520. The user may read the entire story by scrolling upward on the copy column 3520. Alternately, if the copy column 3520 is clicked/tapped on, the entire screen will display the story text.

This particular story about downtown parking is a multi-story including at least one other component besides the modular story itself. A related component is a video, which is displayed in thumbnail form in inset window 3530. If the user clicks on the inset window 3530, the video will play, either in the small inset window 3530 or in full screen mode, at the user's preference.

FIG. 35 illustrates the basic look and feel of any story viewed on the table app 310. Other icons and buttons used in the NewsSlide apps include a reading list button 3540 which displays saved stories for the particular user, if any. A share button 3542 allows a user to share a story on social media or via a messaging service. A home button 3544 displays the NewsSlide home or launch page as in FIG. 1. A section display button 3546 re-activates display of the section bars 110 shown on FIG. 1. A left menu button 3548 turns on the display of a left-side menu bar, discussed below.

Figure 36:
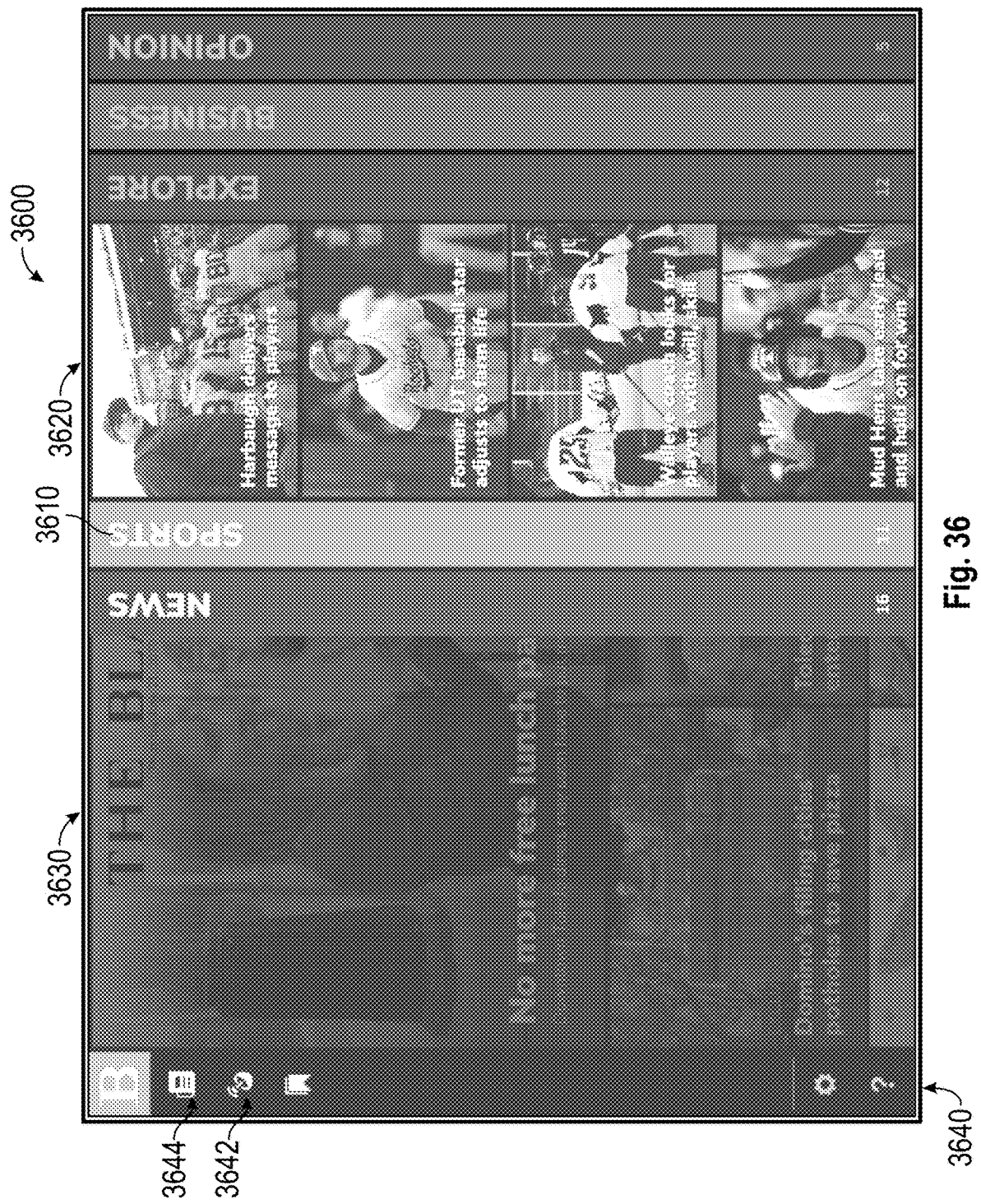
FIG. 36 is an illustration of a screen shot from a tablet device displaying an expanded NewsSlide section, as would result from tapping on the Sports section bar of the launch page displayed in FIG. 1.

FIG. 36 is an illustration 3600 of a screen shot from a tablet device displaying an expanded NewsSlide section, as would result from tapping on the Sports section bar of the launch page displayed in FIG. 1. In the tablet app 310, clicking/tapping on one of the section bars 110 causes that section to expand. In the case of FIG. 36, the user has tapped on a sports section bar 3610, resulting in a display of a column 3620 of sports stories. The user can tap or click on any story to expand that story to the entire display, in the manner shown in FIG. 35. Alternately, the user can scroll upward on the column 3620 of sports stories, viewing the thumbnail or cover image for each and reading them as interest dictates. As indicated by the number at the bottom of the sports section bar 3610, there are 11 stories in the sports section of the currently viewed edition of NewsSlide.

If the user clicks on another section bar, such as Business, that section will be expanded to display a vertical column of stories, and the Sports section will be collapsed. Note that the top news stories from FIG. 1 are still visible at 3630, although they are grayed out while one of the sections is expanded.

A left-side menu bar 3640 is visible in FIG. 36. This is the left-side menu bar which is turned on by clicking on the left menu button 3548 of FIG. 35. Included in the left-side menu bar 3640 is a Breaking News button 3642 which takes the user to a list or grid of latest news stories published independent of the daily editions, as discussed previously. A resume reading button 3644 takes the user back to whatever story was being read prior to the user going to the NewsSlide Home page. The reading list button, discussed previously, is also available in the left-side menu bar 3640, along with the typical settings and help buttons.

As mentioned previously, the table app 310 and the mobile (phone) app 320 behave differently in several ways, where the display behaviors are designed to optimize the user interaction with NewsSlide on either device. FIGS. 37-40 are directed to the look and feel of the mobile app 320.

Figure 37:
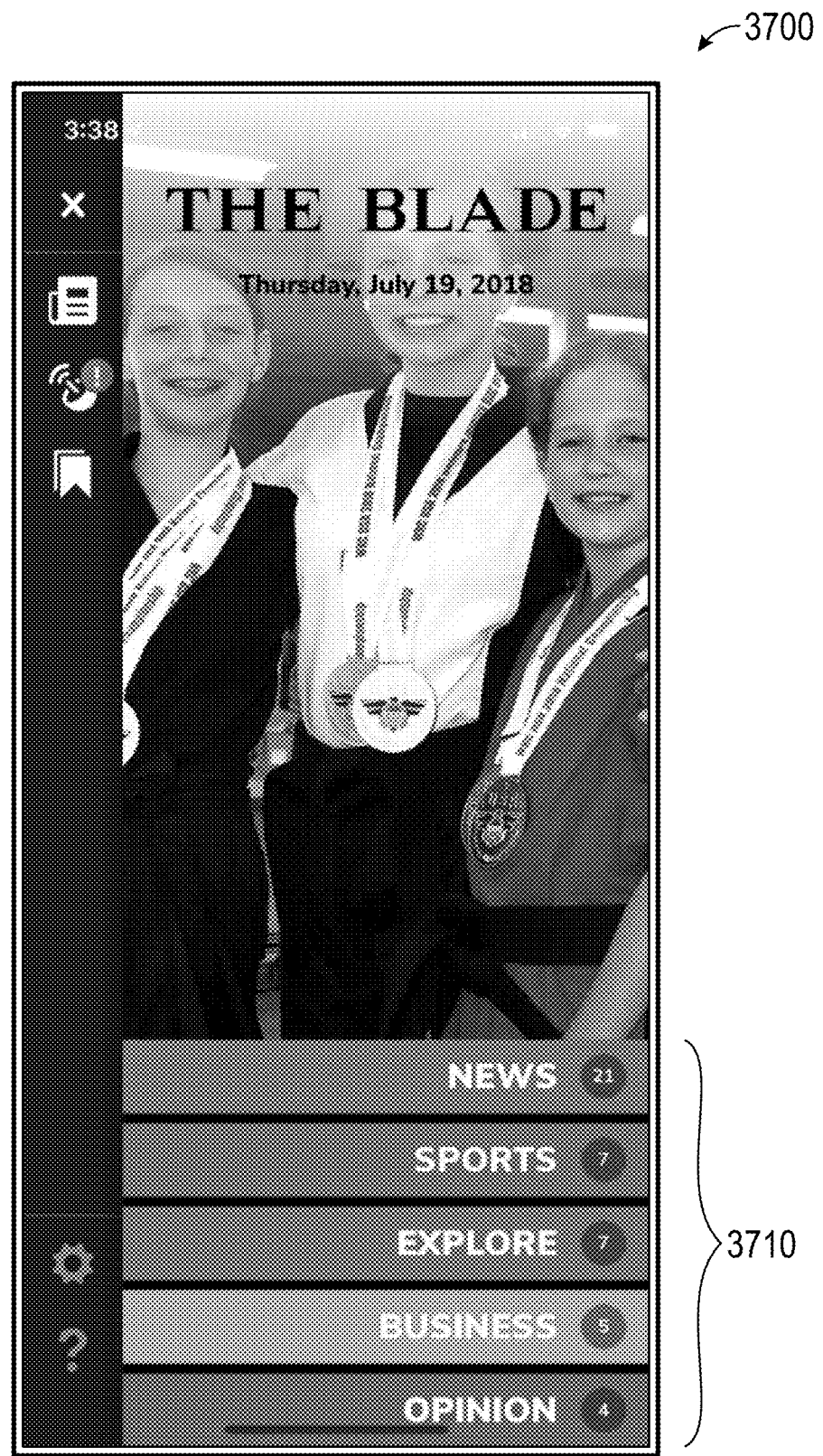
FIG. 37 is an illustration of a screen shot from a smart phone (mobile) device displaying a NewsSlide launch page, similar to that shown in FIG. 2.

FIG. 37 is an illustration 3700 of a screen shot from a smart phone (mobile) device displaying a NewsSlide launch page, similar to that shown in FIG. 2. The mobile app 320 includes section bars 3710 similar to those of the tablet app 310, however the section bars 3710 of the mobile app 320 run horizontally along the bottom of the screen rather than vertically along the right side of the screen. A left-side menu bar 3720 is also displayed on the NewsSlide mobile launch page.

The section bars 3710 of the mobile app 320 also behave differently than those of the tablet app 310. Because of the limited screen real estate on a mobile phone, it is not feasible to expand a section and display thumbnails of all of the stories therein. Rather, when a user clicks on one of the section bars 3710, the NewsSlide mobile app takes the user directly to the first story in that section.

Figure 38:
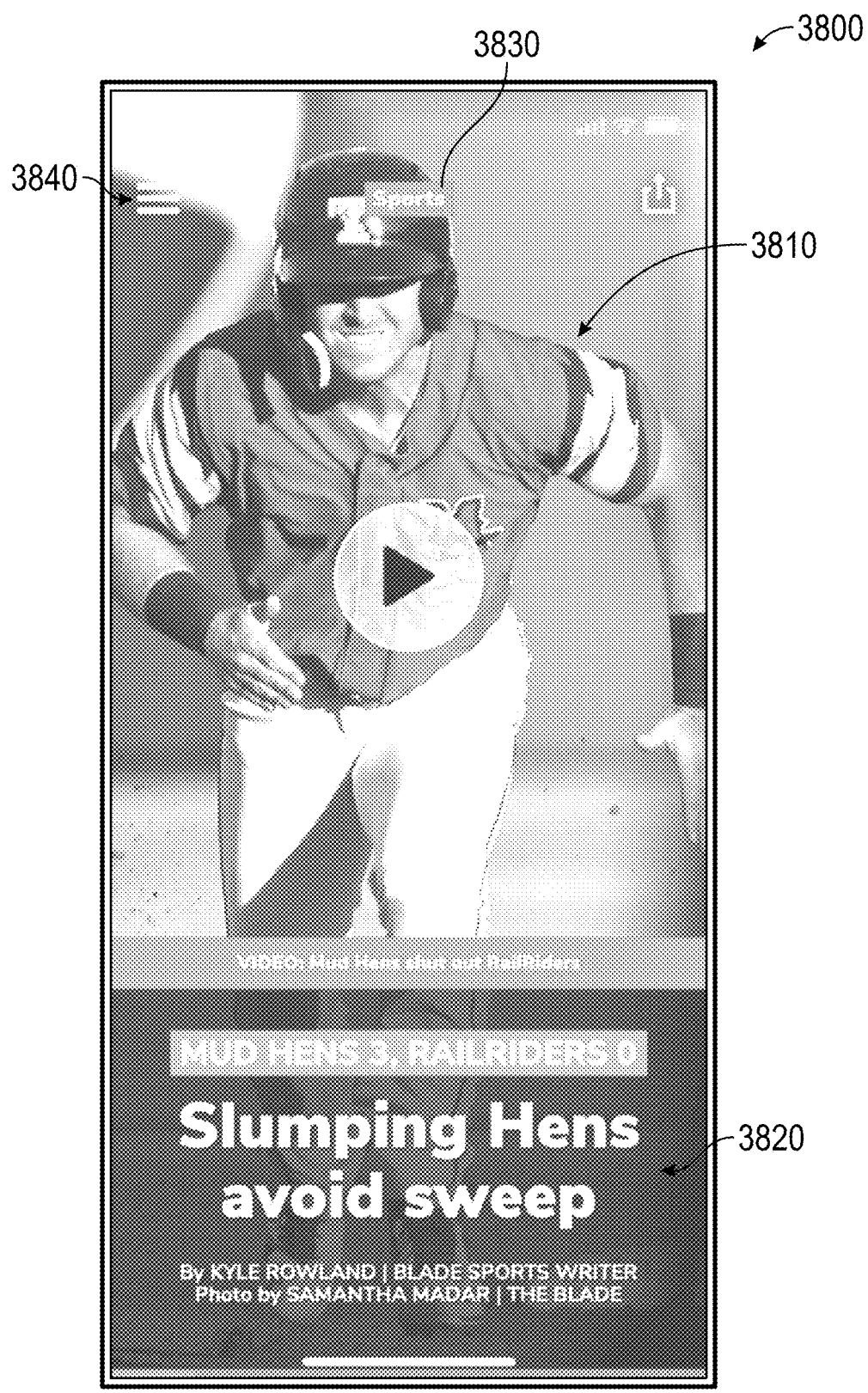
FIG. 38 is an illustration of a screen shot from a mobile device displaying a first story in a NewsSlide section, as would result from tapping on the Sports section bar of the launch page displayed in FIG. 37.

FIG. 38 is an illustration 3800 of a screen shot from a mobile device displaying a first story in a NewsSlide section, as would result from tapping on the Sports section bar of the launch page displayed in FIG. 37. Recall that every story has an ordered position in its section. Thus, when the sports section is entered by clicking on the Sports section bar, the NewsSlide mobile app jumps to the first story in the sports section. This first story includes a cover image 3810, which happens to be a video, and a headline section 3820. The section (Sports) to which the story belongs is displayed in a small block 3830 at the top, and a button 3840 is available to return to display of all section bars.

If the user wants to move on to the next story in the sports section, this can be done by swiping to the left. This would take the user to the second position in the sports section, which might be a story about a local college sports team. Swiping left again would take the user to the third position in the sports section, which might be an ad instead of a story. If the user continues to swipe left past the last position in the sports section, then the first position in the next section (Explore) will be displayed.

Figure 39:
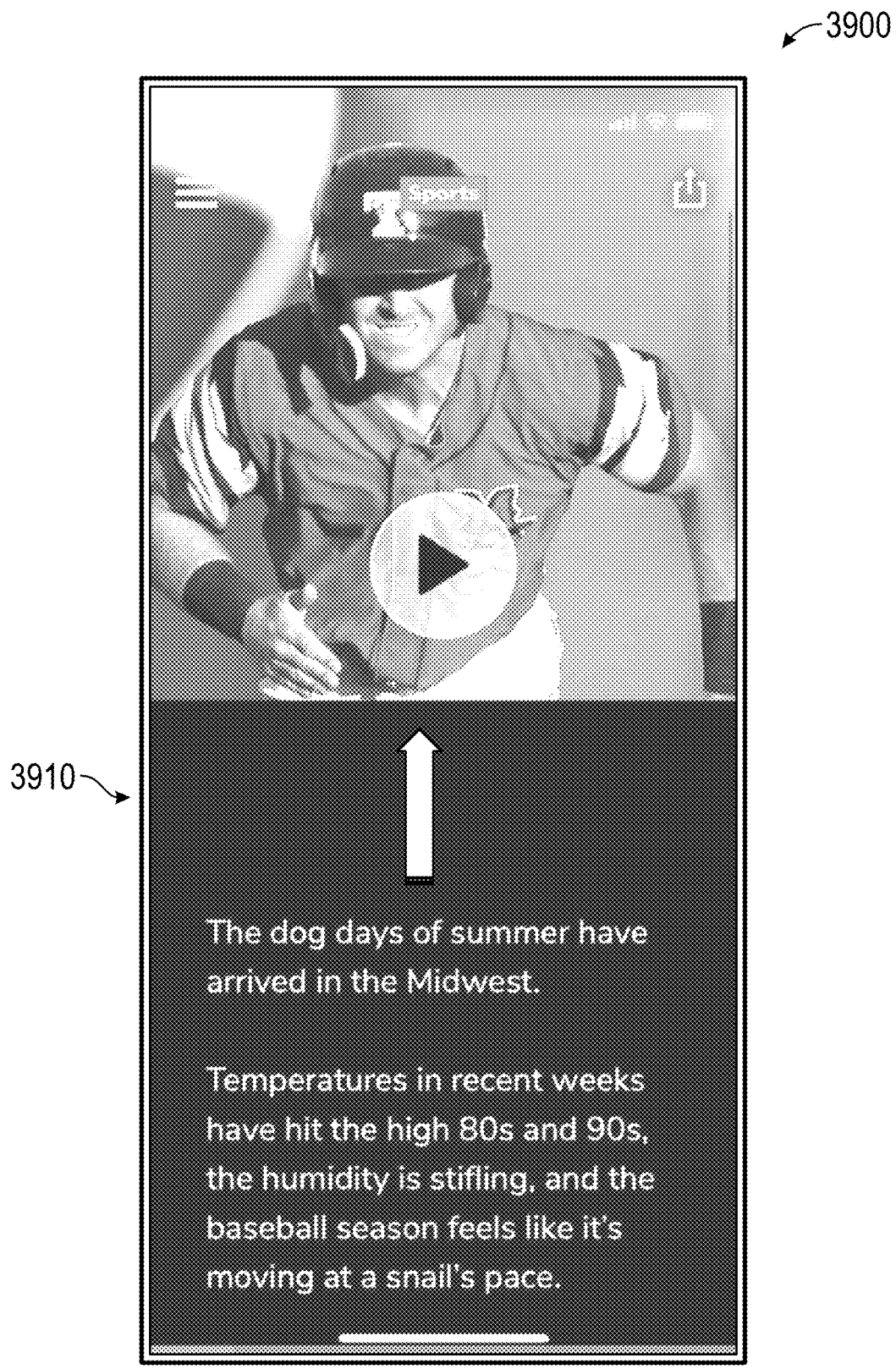
FIG. 39 is an illustration of a screen shot from a mobile device displaying a user's interaction with a NewsSlide story, where the headline section of the screen displayed in FIG. 38 is dragged upward to reveal the story text.

FIG. 39 is an illustration 3900 of a screen shot from a mobile device displaying a user's interaction with the NewsSlide story of FIG. 38. The scenario in FIG. 39 is that the user wishes to read the story displayed in FIG. 38. To do so, the user pulls/drags upward on the headline section 3820, which causes a copy window 3910 to overwrite the headline section 3820 and the cover image 3810, from the bottom up. If the user pulls the copy window 3910 more than about halfway up the screen and lets go, the copy window 3910 will snap to full screen. If the user pulls the copy window 3910 less than about halfway up the screen and lets go, the copy window 3910 will snap back to the bottom and the display will revert to what was shown in FIG. 38.

Figure 40:
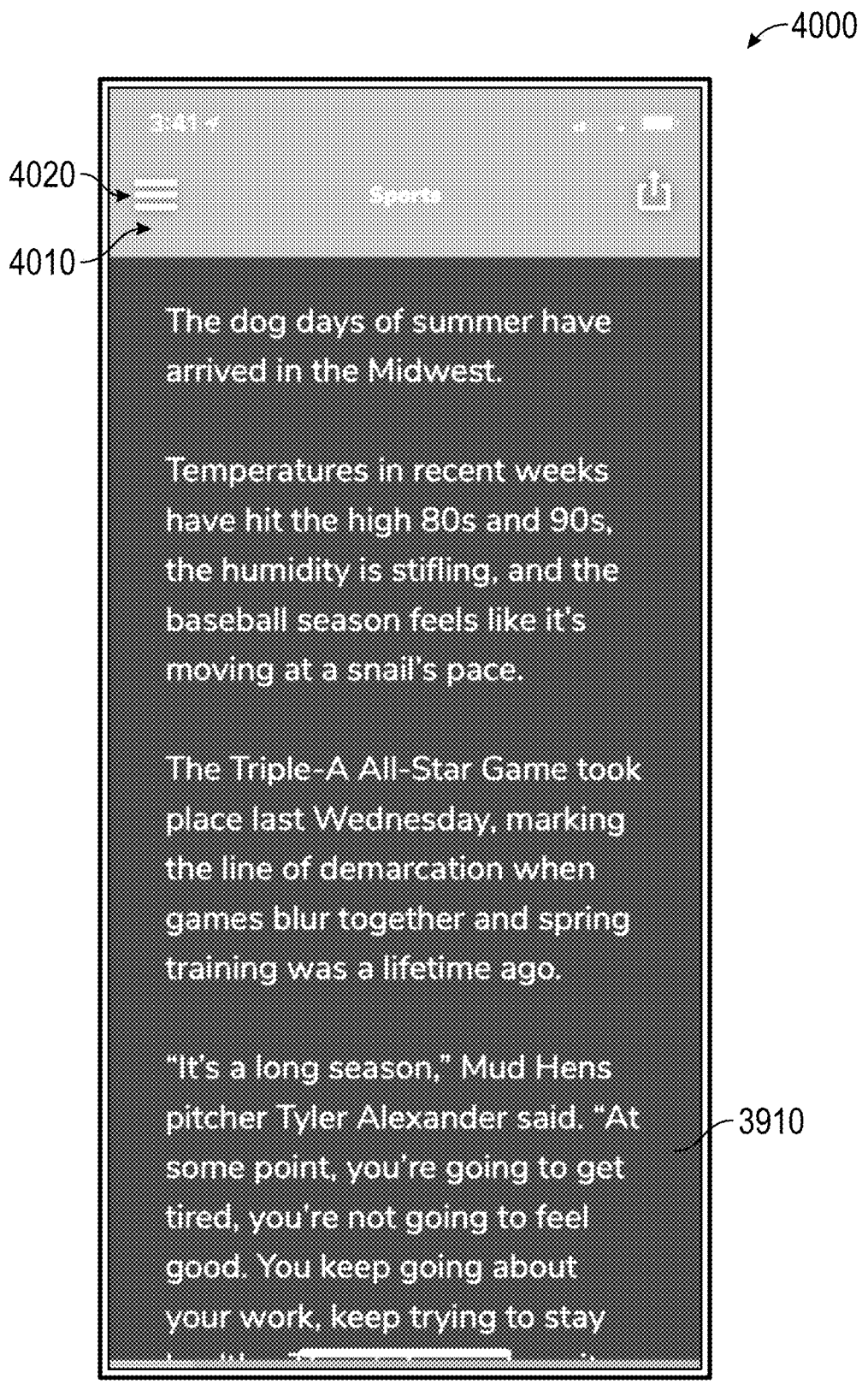
FIG. 40 is an illustration of a screen shot from a mobile device displaying the NewsSlide story of FIG. 38 after the interaction of FIG. 39, where the story text now fills the entire screen.

FIG. 40 is an illustration 4000 of a screen shot from a mobile device displaying the NewsSlide story of FIG. 38 after the interaction of FIG. 39, where the story text now fills the entire screen. In other words, the user dragged the copy window 3910 over halfway up the screen and let go, causing the copy window 3910 to display on nearly the full screen. In this mode, a section banner 4010 is displayed at the top. The entire story can be perused by scrolling upward on the text in the copy window 3910. The story will include all of the text, of course, and may also include additional pictures and/or videos. A button 4020 can be used to go back to the launch page and resume display of all section bars.

Figure 41:
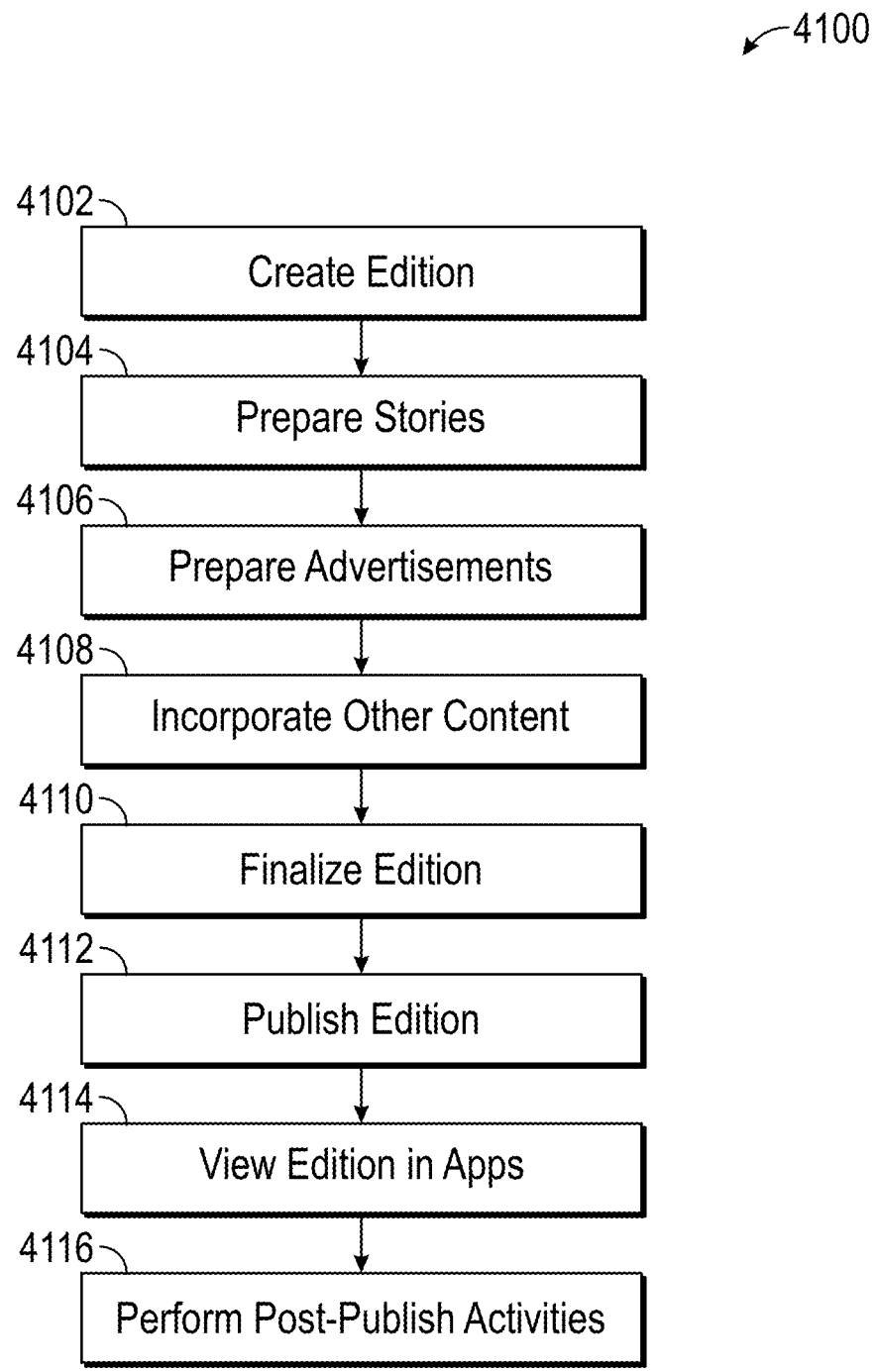
FIG. 41 is a flowchart diagram of a process for publishing an electronic newspaper for viewing in mobile device applications, according to embodiments of the present disclosure.

FIG. 41 is a flowchart diagram 4100 of a process for publishing an electronic newspaper for viewing in mobile device applications, according to embodiments of the present disclosure. At box 4102, an edition of the newspaper is created in Story Creator. Creating the edition includes defining which sections will be included in the edition, and the number of stories and ads to be contained in each section. At box 4104, stories are prepared for the edition. Preparing stories includes importing story content (words, pictures, etc.) from the Content Management System and formatting the story for mobile, tablet and/or share site publication. At box 4106, ads are prepared for the edition. Preparing ads includes importing story content (images, rich content, etc.) from the Content Management System and formatting the ad for the mobile and/or tablet app.

At box 4108, other content is incorporated into the edition. Other content includes content from third-party sources, such as obituaries, classified ads, traffic and weather information. This other content can be viewed in the apps via specific user interactions (such as a right-swipe from the home page in the tablet app), menu selections and/or dedicated buttons. At box 4110, the edition is finalized. Finalization of the edition includes manual review of story and ad content and flow, and the automated error checks discussed previously. At box 4112, the edition is published. Publishing the edition includes producing the specially-formatted versions of the edition for the mobile and tablet apps and pushing the edition to the apps on the user devices, along with posting stories on the share site and sending push notifications. At box 4114, users view the edition in the app on their mobile device. Viewing the edition includes paging through the sections, reading stories, viewing ads and clicking into the ads, interacting with features in the stories and ads, etc. Finally, at box 4116, post-publish activities are performed, including publishing breaking news stories and updating published stories, along with reviewing the performance of stories and ads in the published edition.

As will be well understood by those skilled in the art, the several and various steps and processes discussed herein to describe the invention may be referring to operations performed by a computer, a processor or other electronic calculating device that manipulates and/or transforms data using electrical phenomenon. Those computers and electronic devices, including at least the server used for creating the electronic newspaper editions and the mobile devices used for viewing the electronic newspaper, may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The architecture, systems and methods disclosed above enable efficient preparation and publication of the digital, interactive newspaper NewsSlide to the compatible mobile apps. The mobile apps provide daily editions of the newspaper to users in a package which includes the convenience and the powerful features of a mobile device.

The foregoing discussion describes merely exemplary embodiments of the disclosed methods and systems. One skilled in the art will readily recognize from such discussion and from the accompanying drawings and claims that various changes, modifications and variations can be made therein without departing from the spirit and scope of the disclosed techniques as defined in the following claims.

What is claimed is:

1. A method of publishing and delivering an electronic newspaper, the method comprising the steps of:

providing a suite of mobile applications running on mobile devices of users, the mobile devices having a processor and a non-transitory computer readable media, where the mobile applications are configured on the media of the devices to receive a periodic edition of an electronic newspaper publication and enable a user to view and interact with the publication on the mobile device; and running an electronic newspaper publishing environment on a server computer having a processor and a non-transitory computer readable media, the publishing environment comprising software modules configured on the media of the server including;

a content management system, where the content management system is a database containing content files which are also used for printing the publication, and where the content files include stories, images and advertisements;

a story creator module configured with features including importing content from the content management system, editing and formatting stories and advertisements for publishing, creating an edition of the publication including defining a plurality of sections to include in the edition and assigning stories and advertisements to the sections, arranging the stories and advertisements into sequential positions in the sections, where each story is represented by a thumbnail, finalizing the edition and publishing the edition;

wherein finalizing the edition includes verifying that each section includes a proper pre-defined number of stories, performing an automated error check, verifying that the stories include a diversity of format templates, checking a flow of stories and advertisements in each section, and verifying that all advertisements designated for the edition have been included;

a news service module configured for receiving the edition of the publication from the story creator module and autonomously compiling and formatting the edition for delivery to each of the mobile applications in the suite of mobile applications, wherein the news service module also publishes the plurality of stories to a share site, where the share site is an Internet-accessible website from which the stories are downloadable to a browser application or a social media application running on computer or a mobile device; and wherein the story creator module is further configured for preparing and publishing a breaking news story independent of the edition, where the breaking news story is published to the share site and embedded as a link within the mobile applications.

2. The method according to claim 1 wherein editing and formatting advertisements for publishing includes defining one or more of the advertisements as a fractional-page advertisement and assigning the fractional-page advertisement to share a page and a sequential position with a fractional-page story, where the fractional-page advertisement and the fractional-page story together occupy a full page.

3. The method according to claim 1 further comprising communication links to other content sources from the story creator module, where the links enable incorporation of other content into the edition before publishing, where the other content includes one or more of obituaries, classified ads, weather information and traffic information.

4. The method according to claim 1 wherein the suite of mobile applications include a mobile phone application and a tablet application, and the mobile phone application and the tablet application are each available in a version configured for an Apple iOS operating system and a version configured for a Google Android operating system, wherein the mobile phone application is configured to display the publication in portrait orientation and the tablet application is configured to display the publication in landscape orientation, where preparing the plurality of stories and the plurality of advertisements includes formatting the stories and the advertisements in portrait orientation for the mobile phone application and in landscape orientation for the tablet application, wherein viewing the edition of the publication includes, for the tablet application, tapping on a section bar for one of the sections to expand the section and scrolling through the thumbnails for the stories in the section, tapping on one of the stories in the section to view the story in full, including scrolling up to read the story and tapping on and viewing photos and videos embedded in the story, swiping left or right to view other stories in the section, encountering advertisements in their sequential positions in the section when swiping left or right, and tapping on and viewing the advertisements, and wherein viewing the edition of the publication includes, for the mobile phone application, tapping on a section bar for one of the sections to view a first story in the section, including scrolling up to read the story and tapping on and viewing photos and videos embedded in the story, swiping left or right to view other stories in the section, encountering advertisements in their sequential positions in the section when swiping left or right, and tapping on and viewing the advertisements.

5. The method according to claim 1 wherein editing and formatting stories for publishing includes defining each story as a basic story, a multi-part modular story, a photo gallery, a video gallery or a user-interactive feature.

* * * * *